(12) United States Patent
Yuto et al.

(10) Patent No.: US 9,817,302 B2
(45) Date of Patent: Nov. 14, 2017

(54) LIGHTING DEVICE AND PROJECTOR

(71) Applicant: SEIKO EPSON CORPORATION, Tokyo (JP)

(72) Inventors: Daiki Yuto, Matsumoto (JP); Takahiro Takizawa, Suzaka (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 15/168,818

(22) Filed: May 31, 2016

(65) Prior Publication Data
US 2016/0363845 A1    Dec. 15, 2016

(30) Foreign Application Priority Data

Jun. 11, 2015  (JP) .................................. 2015-118088

(51) Int. Cl.
  *G03B 21/16*  (2006.01)
  *G03B 21/20*  (2006.01)
(52) U.S. Cl.
  CPC ......... *G03B 21/16* (2013.01); *G03B 21/2013* (2013.01); *G03B 21/2026* (2013.01)
(58) Field of Classification Search
  CPC .... G03B 21/16; G03B 21/145; H04N 9/3141; H04N 9/3144
  See application file for complete search history.

(56) References Cited

U.S. PATENT DOCUMENTS

| | | | | |
|---|---|---|---|---|
| 9,016,870 | B2 * | 4/2015 | Lim ...................... | G03B 21/16 353/119 |
| 2004/0190578 | A1 * | 9/2004 | Partlo ................. | G03F 7/70025 372/55 |
| 2010/0026966 | A1 | 2/2010 | Nakano | |
| 2011/0299046 | A1 | 12/2011 | Maehara et al. | |
| 2012/0019790 | A1 * | 1/2012 | Nagarekawa .......... | G03B 21/16 353/98 |
| 2012/0281161 | A1 * | 11/2012 | Hubbard ........... | G02F 1/133308 349/58 |
| 2013/0050663 | A1 * | 2/2013 | Hayashi ............. | G03B 21/2033 353/100 |
| 2013/0050664 | A1 * | 2/2013 | Morohoshi .......... | G03B 21/145 353/119 |
| 2013/0314673 | A1 | 11/2013 | Tateno | |

FOREIGN PATENT DOCUMENTS

| | | |
|---|---|---|
| JP | 2010-038976 A | 2/2010 |
| JP | 2011-253156 A | 12/2011 |
| JP | 2013-246183 A | 12/2013 |

\* cited by examiner

*Primary Examiner* — Sultan Chowdhury
(74) *Attorney, Agent, or Firm* — Oliff PLC

(57) ABSTRACT

A lighting device includes a plurality of light source devices and a holding member (first lamp unit and second lamp unit) holding the plurality of light source devices. The light source device has a light source and a storing body for storing the light source. The storing body has a plurality of openings introducing cooling gas and the holding member (first lamp unit and second lamp unit) includes a diverging device guiding the cooling gas to at least one opening among the plurality of openings.

10 Claims, 21 Drawing Sheets

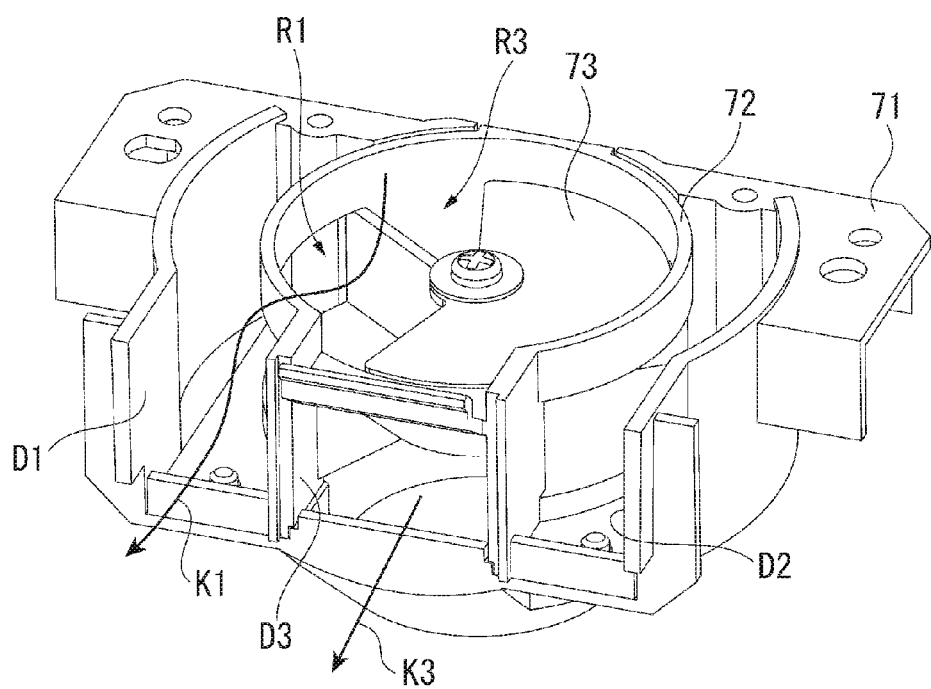
FIG.13
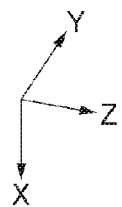

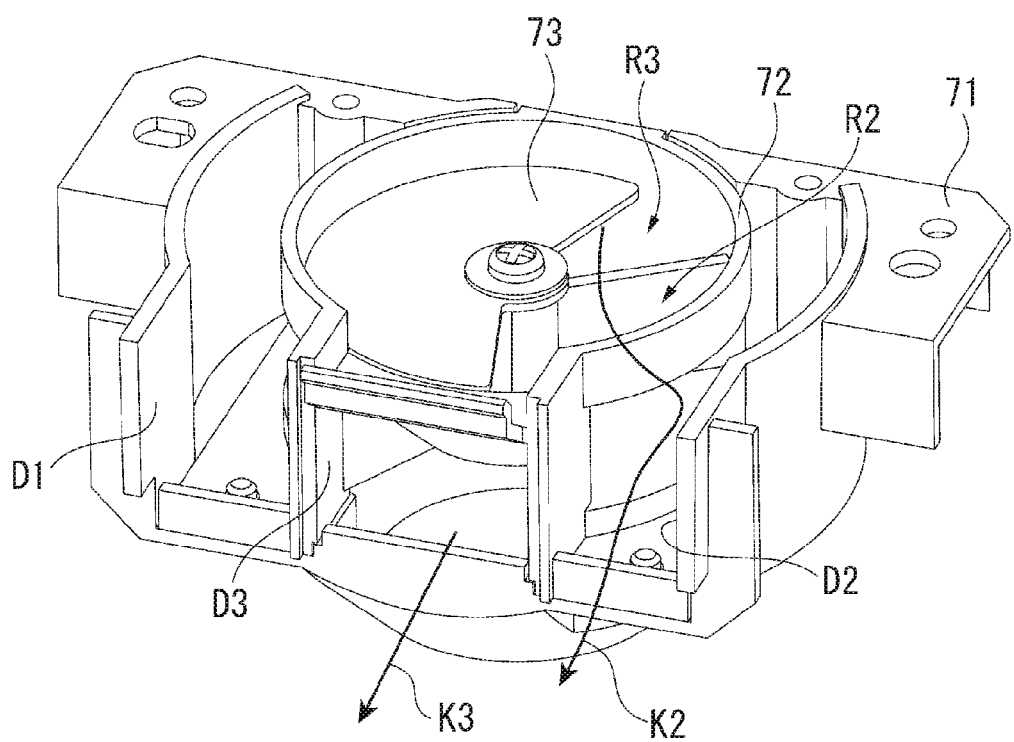
FIG.14
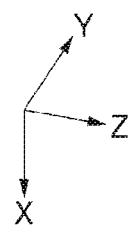

LIGHTING DEVICE AND PROJECTOR

CROSS REFERENCE TO RELATED APPLICATION

The entire disclosure of Japanese Patent Application No. 2015-118088, filed Jun. 11, 2015 is expressly incorporated by reference herein.

BACKGROUND

1. Technical Field

The present invention relates to a lighting device and a projector.

2. Related Art

In related art, a projector including a lighting device, a light modulation device that forms an image corresponding to image information by modulating light emitted from the lighting device, and a projection optical device that enlarges and projects the image on a projection surface, such as a screen, has been known.

As such a projector, a projector including a light source device for varying a cooling position of a light source lamp according to a posture of the projector has been known (for example, JP-A-2010-38976).

The light source device of the projector described in JP-A-2010-38976 includes the light source lamp and a storing body storing the light source lamp on an inside. The storing body includes a pair of openings, a duct portion having an inlet on a side opposite to the pair of openings, and a rectification member rotating by its own weight, and causes cooling air to circulate to either one of the pair of openings via the duct portion by the rectification member rotating by its own weight.

However, in the light source device described in JP-A-2010-38976, there is a problem that since the rectification member is provided in the storing body storing the light source lamp, the light source device is increased in size. Therefore, it is necessary to enlarge a space for mounting the light source device in the projector. In addition, in the projector including a plurality of light source devices, since it is necessary to further enlarge the space described above and the light source device that is a replacement part is large, there is a problem that mounting of the light source device on the projector becomes complicated.

SUMMARY

An advantage of some aspects of the invention is to provide a lighting device and a projector in which a light source device can be reduced in size.

A lighting device according to a first aspect of the invention includes a plurality of light source devices; and a holding member for holding the plurality of light source devices. The light source device includes a light source, and a storing body storing the light source. The storing body has a plurality of openings for introducing cooling gas. The holding member includes a diverging device for guiding the cooling gas to at least one opening among the plurality of openings.

As the light source, a light source device configured of a solid-state light source such as a light emitting tube, a light emitting diode (LED), and a laser diode (LD), and a reflector, or a light source device configured of the solid-state light source, the reflector, and a storing body (housing) for storing these members can be exemplified.

According to the first aspect, since the diverging device is provided in the holding member, it is possible to reliably reduce the size of the light source device compared to a case in which the diverging device is provided in the light source device. In addition, it is possible to guide the cooling gas to at least one opening among the plurality of openings provided in the storing body of the light source device. Thus, for example, if circulating paths of the cooling gas introduced from each of the plurality of openings are different from each other, it is possible to supply the cooling gas to a desired circulating path by selecting the cooling gas.

In the first aspect, it is preferable that the diverging device is provided in each of the plurality of light source devices.

According to the first aspect, since the diverging device is provided in each of the light source devices, it is possible to reduce the size of the diverging device compared to a diverging device that performs divergence of the cooling gas to the plurality of light source devices. Therefore, it is possible to reduce the size of the lighting device.

In the first aspect, it is preferable that the diverging device changes the opening mainly guiding the cooling gas according to a posture of the lighting device.

Here, if the light source of the light source device is configured of the light emitting tube and the reflector, an upper portion of the light emitting tube is likely to attract heat due to light emission more than a lower portion and a temperature difference occurs between the upper portion and the lower portion. Such a local temperature difference causes deterioration, such as white turbidity and deformation of glass configuring the light emitting tube, and is a factor which shortens the life of the light emitting tube. In contrast, according to the first aspect described above, since the cooling gas is mainly guided to a position in which heat of the light source is likely to be attracted, it is possible to effectively cool the light source.

In the first aspect, it is preferable that the diverging device includes a plurality of duct portions connected to each of the plurality of openings, and an opening/closing section positioned on a side of the plurality of duct portions to which the cooling gas is introduced and provided for opening and closing at least a part of the plurality of duct portions, and the opening/closing section is configured of a rotating plate rotating by its own weight.

According to the first aspect, the rotating plate rotates by its own weight, opens and closes at least a part of the plurality of duct portions, and then switches the flow path of the cooling gas. Therefore, for example, it is possible to circulate the cooling gas to any one of the plurality of duct portions according to the posture of the lighting device. In addition, since such a rotating plate switches the flow path of the cooling gas by its own weight, there is no need to provide a detection unit for detecting the installation posture of the lighting device and a rotating unit such as a motor for rotating the rotating plate according to the detected posture. Therefore, even if the lighting device is in any posture, it is possible to always blow the cooling gas to the position in which heat of the light source is likely to be attracted. Thus, it is possible to efficiently cool the light source with a simple configuration.

A projector according to a second aspect of the invention includes the lighting device described above; a light modulation device modulating light emitted from the lighting device; a projection optical device projecting an image based on light modulated by the light modulation device; and a cooling device supplying the cooling gas.

According to the second aspect, it is possible to achieve the same effect as the lighting device according to the first aspect. In addition, since it is possible to reduce the light source by the lighting device, it is possible to reduce the sizes of the lighting device including the light source device and the projector. In addition, since it is possible to reduce the size of the light source device, it is possible to easily perform replacement work of the light source device and the like.

In the second aspect, it is preferable that the holding member is configured to be replaced according to an installation posture of the projector.

Here, as the installation posture of the projector, a portrait posture that is obtained by rotating the projector by 90° in a direction orthogonal to a rotating direction can be exemplified in addition to a normal posture, an upward posture that is obtained by rotating the projector by 90° in a counter-clockwise direction from the normal posture, and a downward posture that is obtained by rotating the projector in a clockwise direction from the normal posture. Among them, if the projector is installed in the portrait posture with respect to the normal posture, the upward posture, and the downward posture, it is not preferable that the opening to which the cooling gas is guided is selected by the diverging device.

In contrast, in the embodiment, since the holding member is configured to be replaced according to an installation posture of the projector, for example, the lighting device, in which the light source device is mounted on the holding member mounting the diverging device suitable for the portrait posture, can be mounted on the projector instead of the diverging device provided in the holding member. Therefore, even if the projector takes any one of the installation postures, it is possible to reliably cool the light source.

In the second aspect, it is preferable that the diverging device is configured to be replaced according to an installation posture of the projector.

In the aspect, since the diverging device is configured to be replaced according to the installation posture of the projector, for example, the lighting device, on which the diverging device suitable for the portrait posture is mounted, can be mounted on the projector instead of the diverging device. Therefore, even if the projector takes any one of the installation postures, it is possible to reliably cool the light source.

BRIEF DESCRIPTION OF THE DRAWINGS

The invention will be described with reference to the accompanying drawings, wherein like numbers reference like elements.

FIG. 13 is a view illustrating the flow path of the cooling gas circulating the diverging device according to the embodiment.

FIG. 14 is a view illustrating the flow path of the cooling gas circulating the diverging device according to the embodiment.

DESCRIPTION OF EXEMPLARY EMBODIMENTS

Hereinafter, one embodiment of the invention will be described with reference to drawings.

External Configuration of Projector

Figure 1:
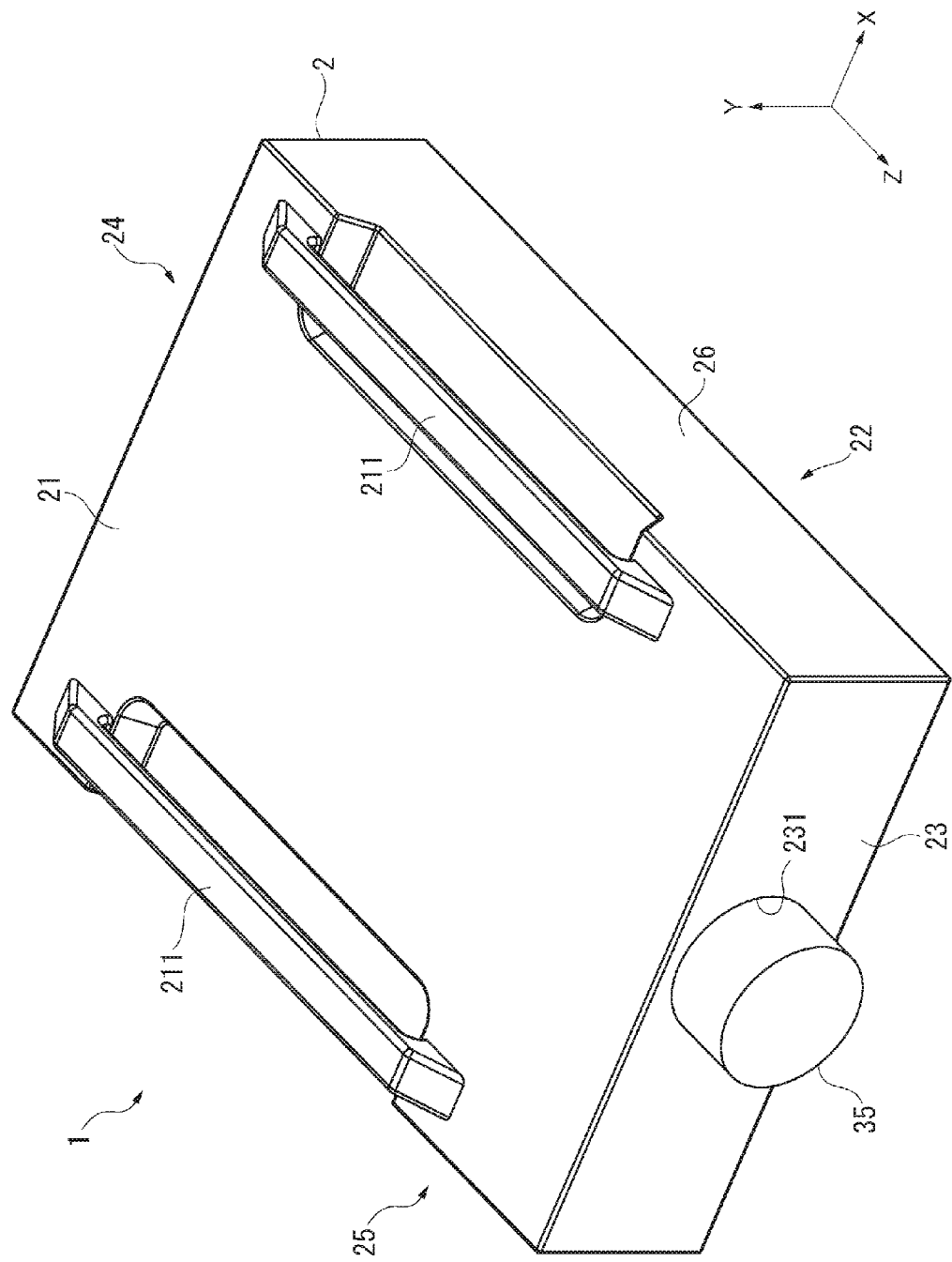
FIG. 1 is a schematic perspective view illustrating a projector according to one embodiment of the invention.

FIG. 1 is a schematic perspective view illustrating a projector 1 according to the embodiment.

The projector 1 according to the embodiment is a projection type display device that forms an image according to image information by modulating light emitted from a lighting device 31 described below and enlarges, and projects the image on the projection surface such as a screen.

Figure 2:
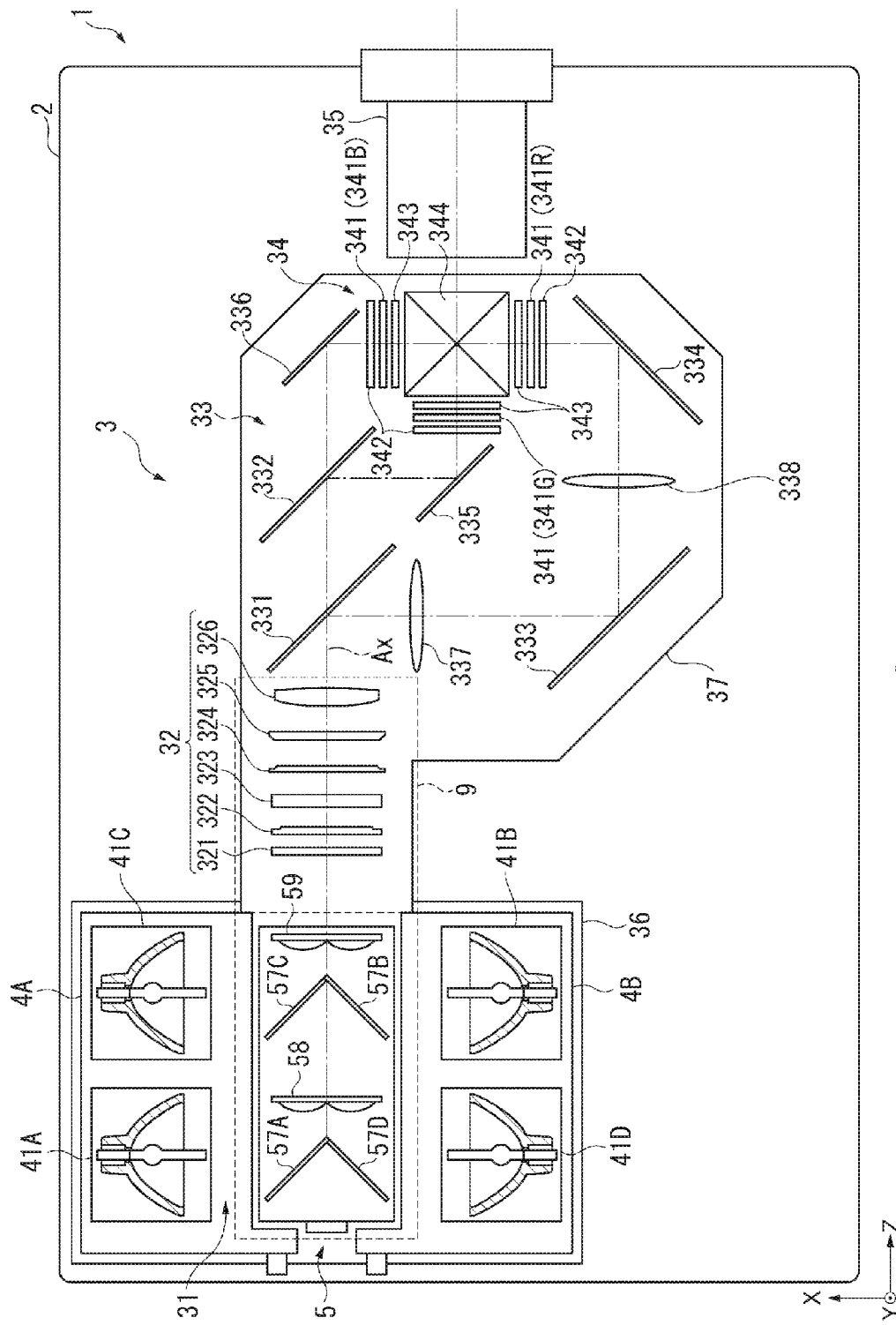
FIG. 2 is a schematic view illustrating an internal configuration of the projector according to the embodiment.

The projector 1 is a multiple-lamp type projector including four light source devices 41A to 41D (see FIG. 2). As will be described later in detail, light emitted from the four light source devices 41A to 41D is emitted from the lighting device 31 by being reflected in the same direction by an optical path changing device 5 and is incident on a light modulation device through a plurality of optical parts.

An exterior housing 2 is formed in a substantially rectangular parallelpiped shape having a top portion 21, a bottom portion 22, a front portion 23, a rear portion 24, a left side portion 25, and a right side portion 26.

The top portion 21 has a pair of handle portions 211 that is used when gripping the projector 1 by a user or fixing the projector 1 to an apparatus installed in a ceiling and the like.

The bottom portion 22 has leg portions (not illustrated) coming into contact with an installation surface when mounting the projector 1 on the installation surface of an installation stand and the like.

The front portion 23 has an opening 231 from which a part of a projection optical device 35 configuring an image forming apparatus 3 described below is exposed.

The rear portion 24 has an opening (not illustrated) for storing a first lamp unit 4A described below, a second lamp unit 4B (see FIG. 2), and the optical path changing device 5 (see FIG. 2) within the exterior housing 2 to be replaced, and the opening is covered by a cover member (not illustrated).

Besides these members, although not illustrated, the right side portion 26 has an inlet for introducing air outside the exterior housing 2 into an inside and the left side portion 25 has an outlet for discharging air on the inside of the exterior housing 2 to the outside.

Moreover, in the following description, an emitting direction of light by the lighting device 31 is referred to as a Z direction and directions respectively orthogonal to the Z direction and orthogonal to each other are referred to as an X direction and a Y direction. In the embodiment, the description is given in which since the Z direction is a direction from the rear portion 24 to the front portion 23, the X direction is a direction from the left side portion 25 to the right side portion 26 and the Y direction is a direction from the bottom portion 22 to the top portion 21.

Internal Configuration of Projector

FIG. 2 is a schematic view illustrating an internal configuration of the projector 1.

As illustrated in FIG. 2, the projector 1 includes the image forming apparatus 3 and a cooling device 9 for cooling configuration parts of the projector 1 which are disposed on an inside of the exterior housing 2 in addition to the exterior housing 2. Besides these members, although not illustrated, the projector 1 includes a control device for controlling the projector 1 and a power supply device for supplying power to electronic parts configuring the projector 1.

Configuration of Image Forming Apparatus

The image forming apparatus 3 forms and projects an image according to image information input from the control device. The image forming apparatus 3 includes the lighting device 31, an equalizing device 32, a color separation device 33, an electro-optical device 34, the projection optical device 35, a base member 36, and an optical part housing 37.

Among them, the base member 36 connected to the optical part housing 37 has a function of storing and fixing the lighting device 31.

In addition, the optical part housing 37 is a box-shaped housing in which a lighting optical axis Ax is provided on an inside. The equalizing device 32 and the color separation device 33 are disposed in positions on the lighting optical axis Ax on the inside of the optical part housing 37. In addition, the lighting device 31, the electro-optical device 34, and the projection optical device 35 are positioned outside the optical part housing 37 and disposed according to the lighting optical axis Ax.

The lighting device 31 emits parallel light to the equalizing device 32. A configuration of the lighting device 31 will be described later.

The equalizing device 32 equalizes illuminance in an orthogonal plane with respect to a center axis of a luminous flux emitted from the lighting device 31. The equalizing device 32 has a cinema filter 321, a first lens array 322, a UV filter 323, a second lens array 324, a polarization conversion element 325, and a superimposing lens 326.

Among them, the polarization conversion element 325 aligns a polarization direction of the incident light to one type.

The color separation device 33 separates the luminous flux incident from the equalizing device 32 to three color light beams of red (R), green (G), and blue (B). The color separation device 33 has dichroic mirrors 331 and 332, reflective mirrors 333 to 336, and relay lenses 337 and 338.

The electro-optical device 34 modulates each separated color light beam according to the image information and then synthesizes each modulated color light beam. The electro-optical device 34 has a liquid crystal panel 341 (liquid crystal panels for red, green, and blue are respectively referred to as 341R, 341G, and 341B) as the light modulation device provided in each color light beam, an incident-side polarization plate 342, an emission-side polarization plate 343, and one color synthesizing device 344. Among them, as the color synthesizing device 344, a dichroic prism can be employed.

The projection optical device 35 is a projection lens that enlarges and projects the luminous flux (the luminous flux forming an image) synthesized by the color synthesizing device 344 on the projection surface. As such a projection optical device 35, a combination lens in which a plurality of lenses are disposed within a barrel can be employed.

Configuration of Lighting Device

Figure 3:
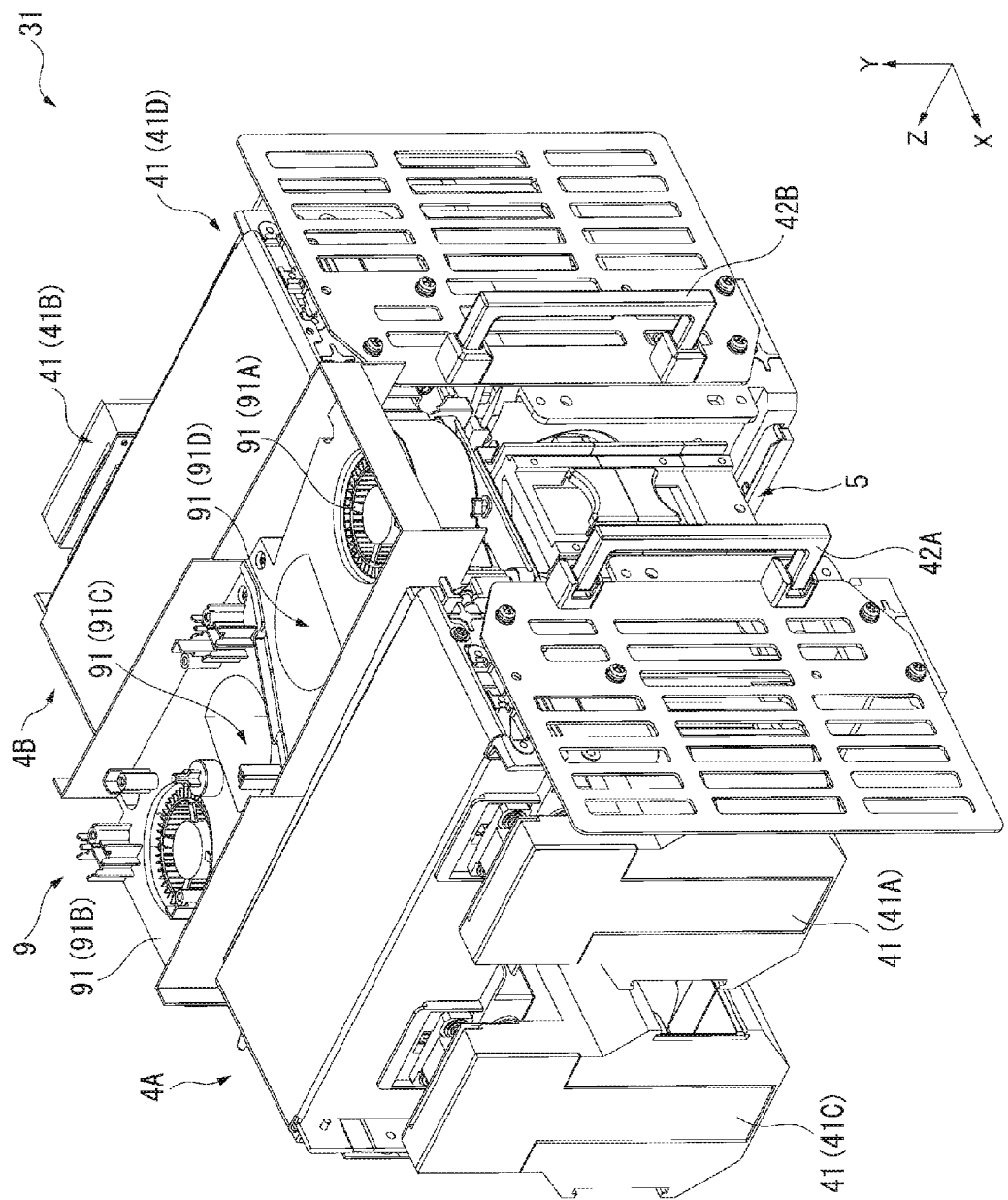
FIG. 3 is a perspective view illustrating a lighting device according to the embodiment.
Figure 4:
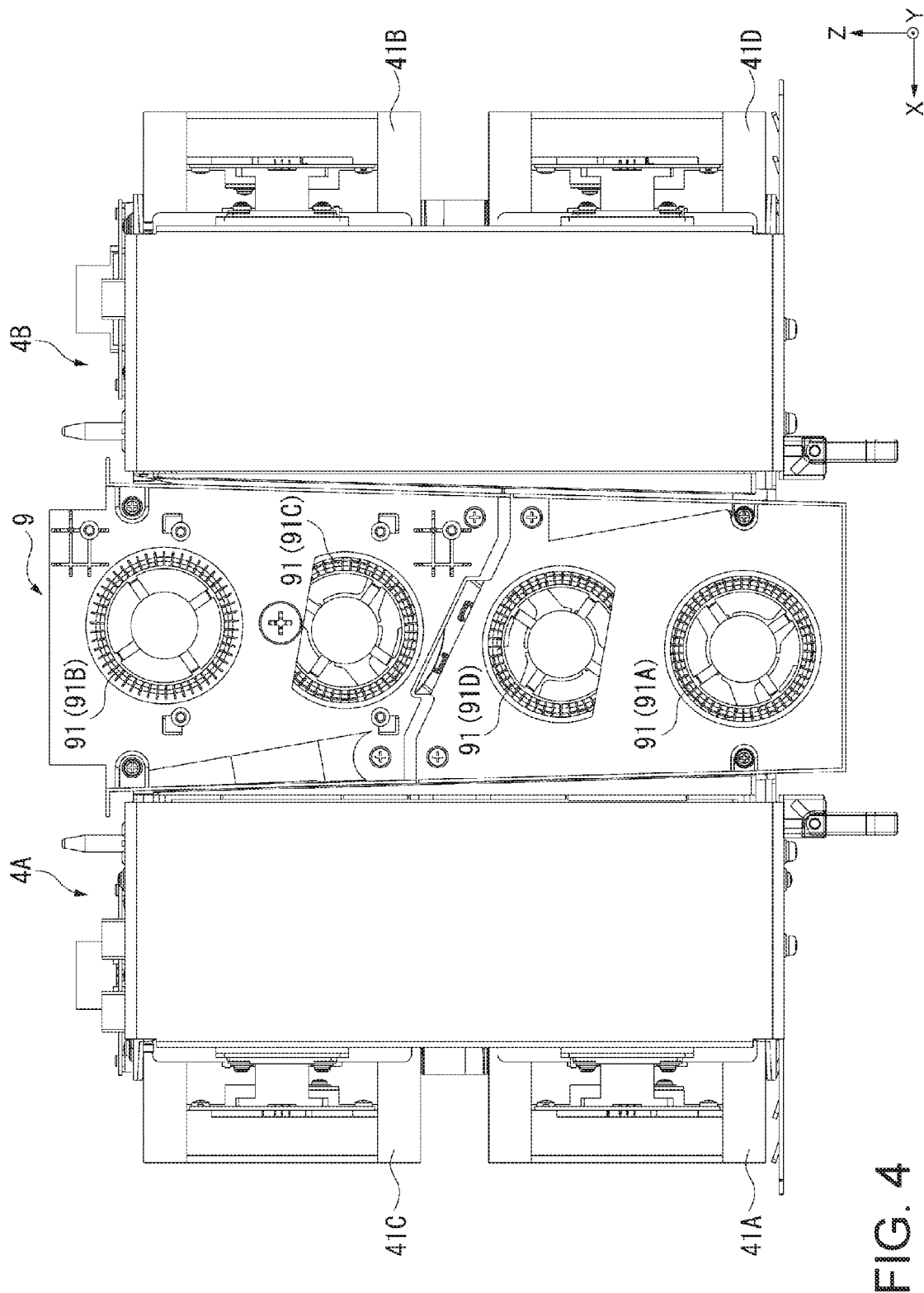
FIG. 4 is a plan view of the lighting device according to the embodiment.

FIG. 3 is a perspective view of the lighting device 31 viewed from a side in the direction opposite to the Z direction and FIG. 4 is a plan view of the lighting device 31 viewed from the Y direction side.

As illustrated in FIGS. 2 to 4, the lighting device 31 has four light source devices 41 (41A to 41D) respectively fixed to the first lamp unit 4A and the second lamp unit 4B. Besides, the lighting device 31 includes the optical path changing device 5 that reflects light emitted from each of the light source devices 41A to 41D in the same direction and emits the light by aligning the light in one direction. Furthermore, the lighting device 31 includes the cooling device 9 for cooling the light source device 41. The cooling device 9 includes a plurality of cooling fans 91 (91A to 91D) corresponding to each of the light source devices 41A to 41D.

In addition, the first lamp unit 4A includes the light source device 41A and the light source device 41C, and the second lamp unit 4B includes the light source device 41B and the light source device 41D. The first lamp unit 4A and the second lamp unit 4B are respectively disposed on the X direction and a side in the direction opposite to the X direction and the optical path changing device 5 is interposed therebetween.

Configuration of Lamp Unit

Figure 5:
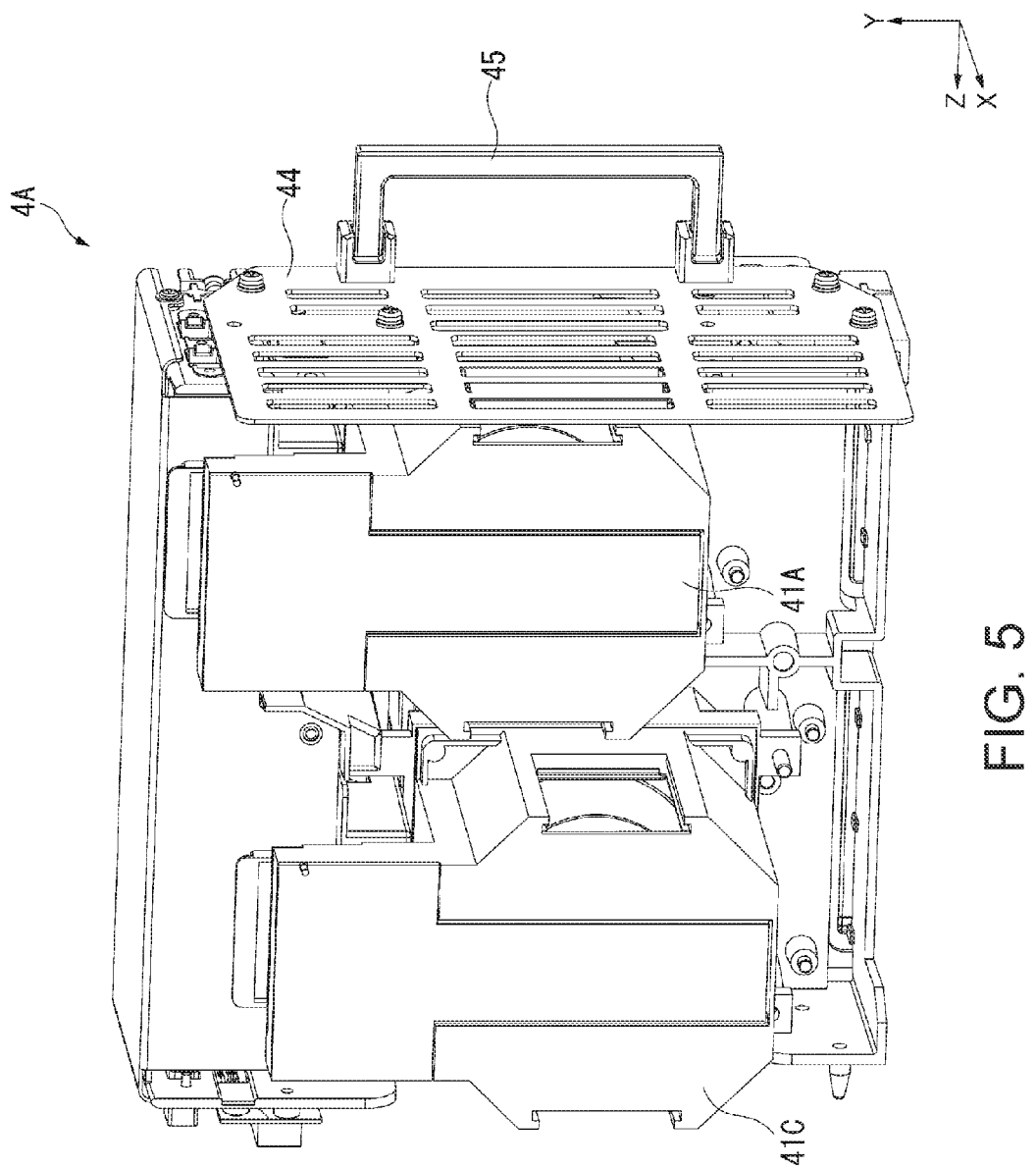
FIG. 5 is a perspective view illustrating a first lamp unit according to the embodiment.
Figure 6:
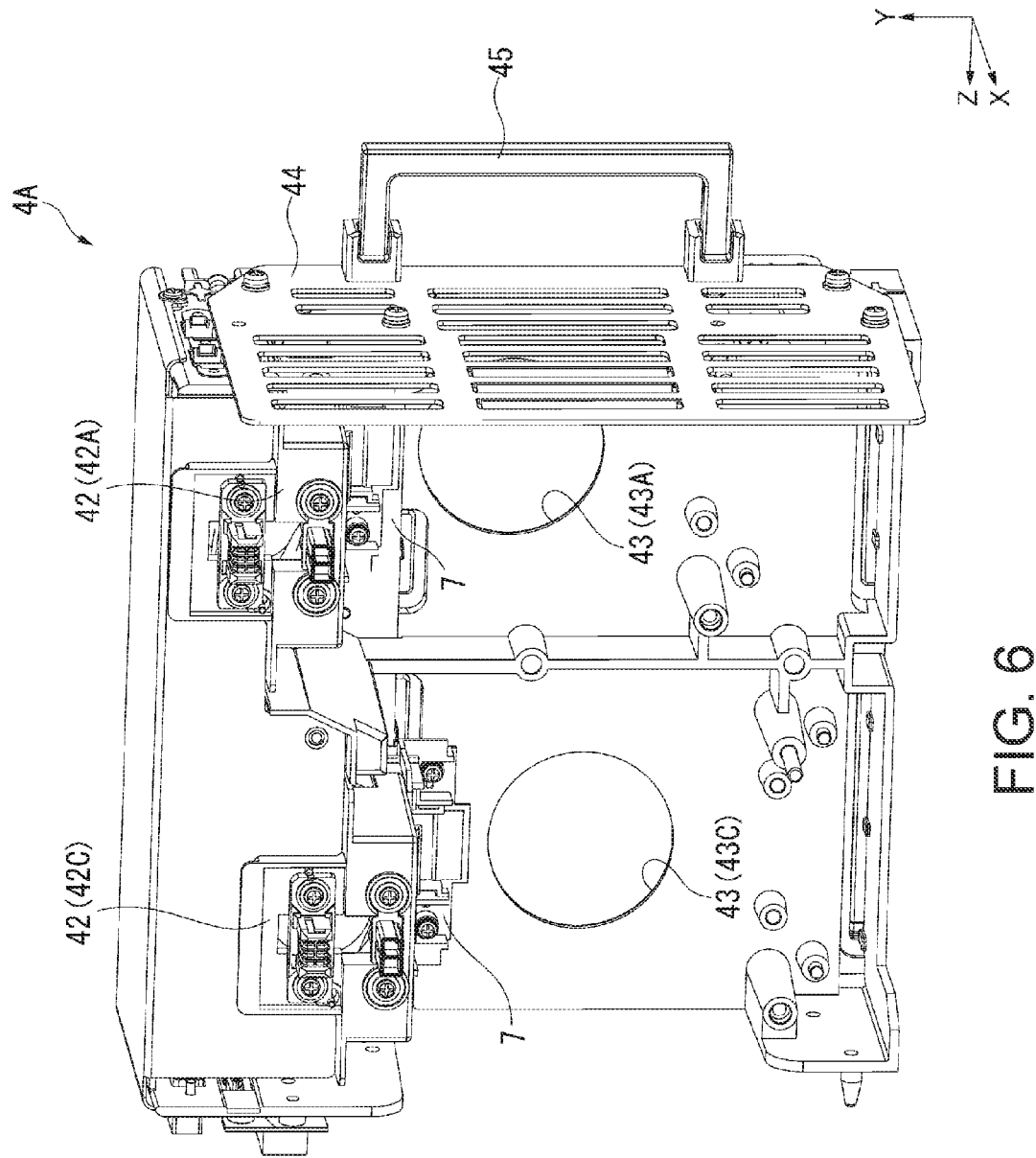
FIG. 6 is a perspective view illustrating the first lamp unit in a state in which a light source device according to the embodiment is removed.

FIG. 5 is a perspective view of the first lamp unit 4A viewed from the X direction side and FIG. 6 is a perspective view of the first lamp unit 4A viewed from the X direction side in a state in which the light source devices 41A and 41C are removed. Moreover, since the first lamp unit 4A and the second lamp unit 4B have substantially the same configuration, in the following description, only the first lamp unit 4A will be described.

As illustrated in FIGS. 5 and 6, the first lamp unit 4A includes a connecting portion 42, an opening 43, a panel 44, a grip portion 45, and a diverging device 7. Among them, as illustrated in FIG. 6, the connecting portion 42 has a connecting portion 42A to which the light source device 41A is connected and a connecting portion 42C to which the light source device 41C is connected. The connecting portion 42A is provided on a side in the direction opposite to the Z direction and the Y direction side with respect to the connecting portion 42C. In addition, the opening 43 includes an opening 43A through which light emitted from the light source device 41A transmits and an opening 43C through which light emitted from the light source device 41C transmits. Similar to the connecting portion 42A, the opening 43A is provided on a side in the direction opposite to the Z direction and the Y direction side with respect to the connecting portion 42C.

With such a configuration, the light source device 41A is fixed to the first lamp unit 4A so as to be positioned on a side in the direction opposite to the Z direction and the Y direction side with respect to the light source device 41A and the light source device 41C is fixed to the first lamp unit 4A so as to be positioned on the Z direction side and a side in the direction opposite to the Y direction with respect to the light source device 41A. Then, light emitted from the light source devices 41A and 41C is emitted to the optical path changing device 5 via the openings 43A and 43C.

In addition, the panel 44 configures a surface of the first lamp unit 4A on the side in the direction opposite to the Z direction and the substantially U-shaped grip portion 45 protruding on a side in the direction opposite to the Z direction from the surface is installed to the surface of the panel 44 on a side in the direction opposite to the Z direction. Therefore, an operator removes the first lamp unit 4A from the projector 1 by pulling the grip portion 45 on the side in the direction opposite to the Z direction.

Moreover, the first lamp unit 4A and the second lamp unit 4B correspond to the holding member according to the invention.

Configuration of Diverging Device

Figure 7:
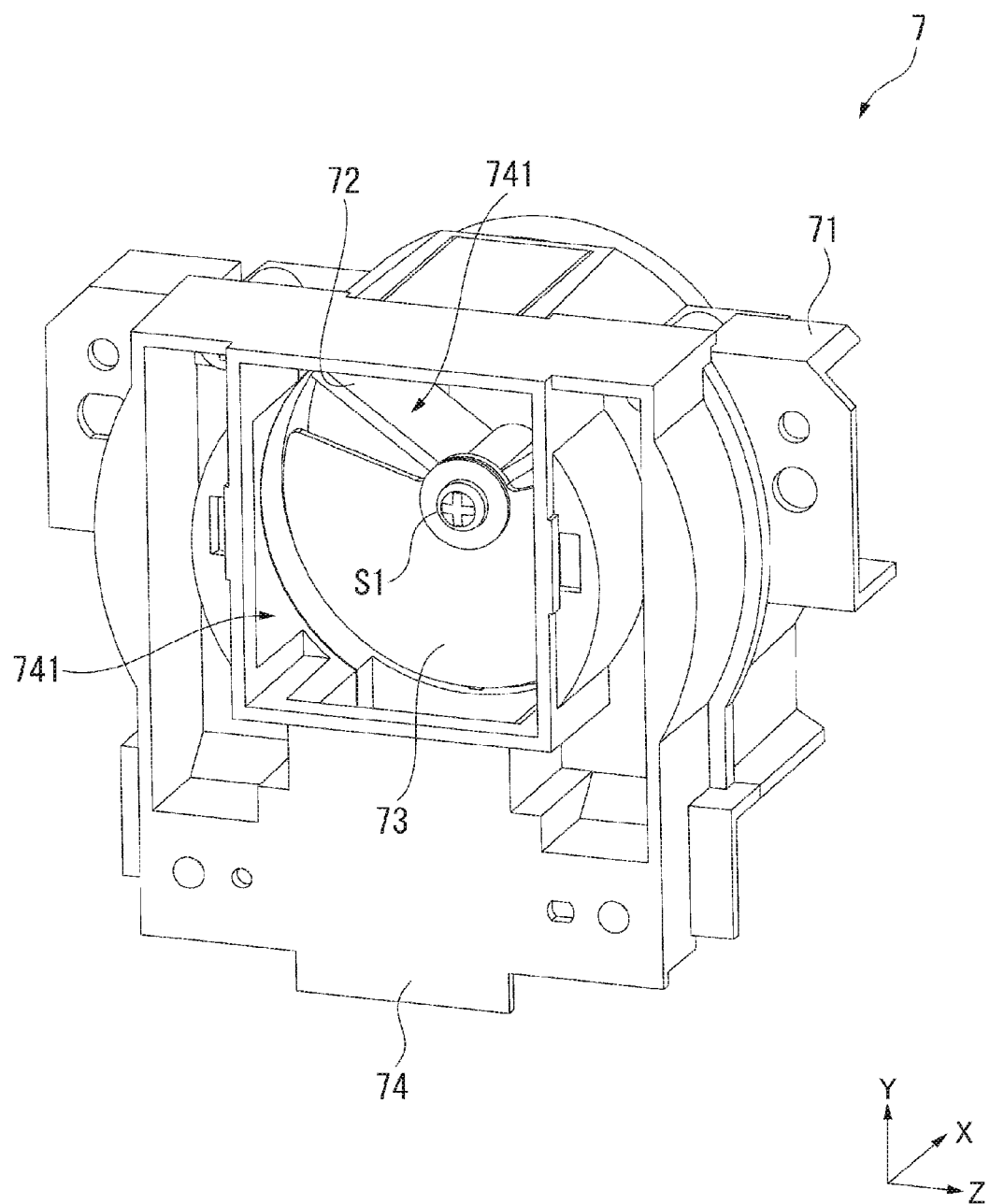
FIG. 7 is a perspective view illustrating a diverging device according to the embodiment.
Figure 8:
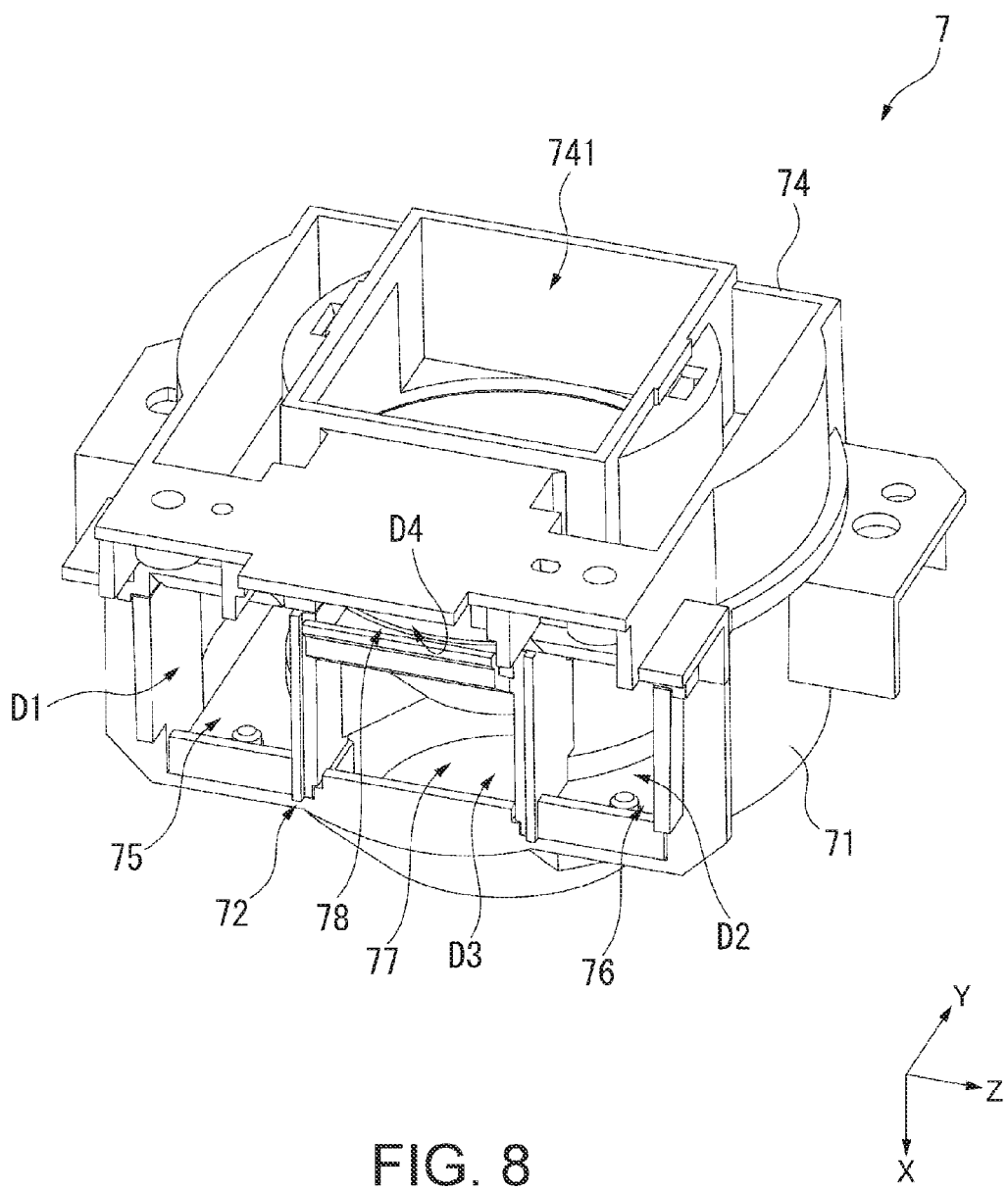
FIG. 8 is a perspective view illustrating the diverging device according to the embodiment.
Figure 9:
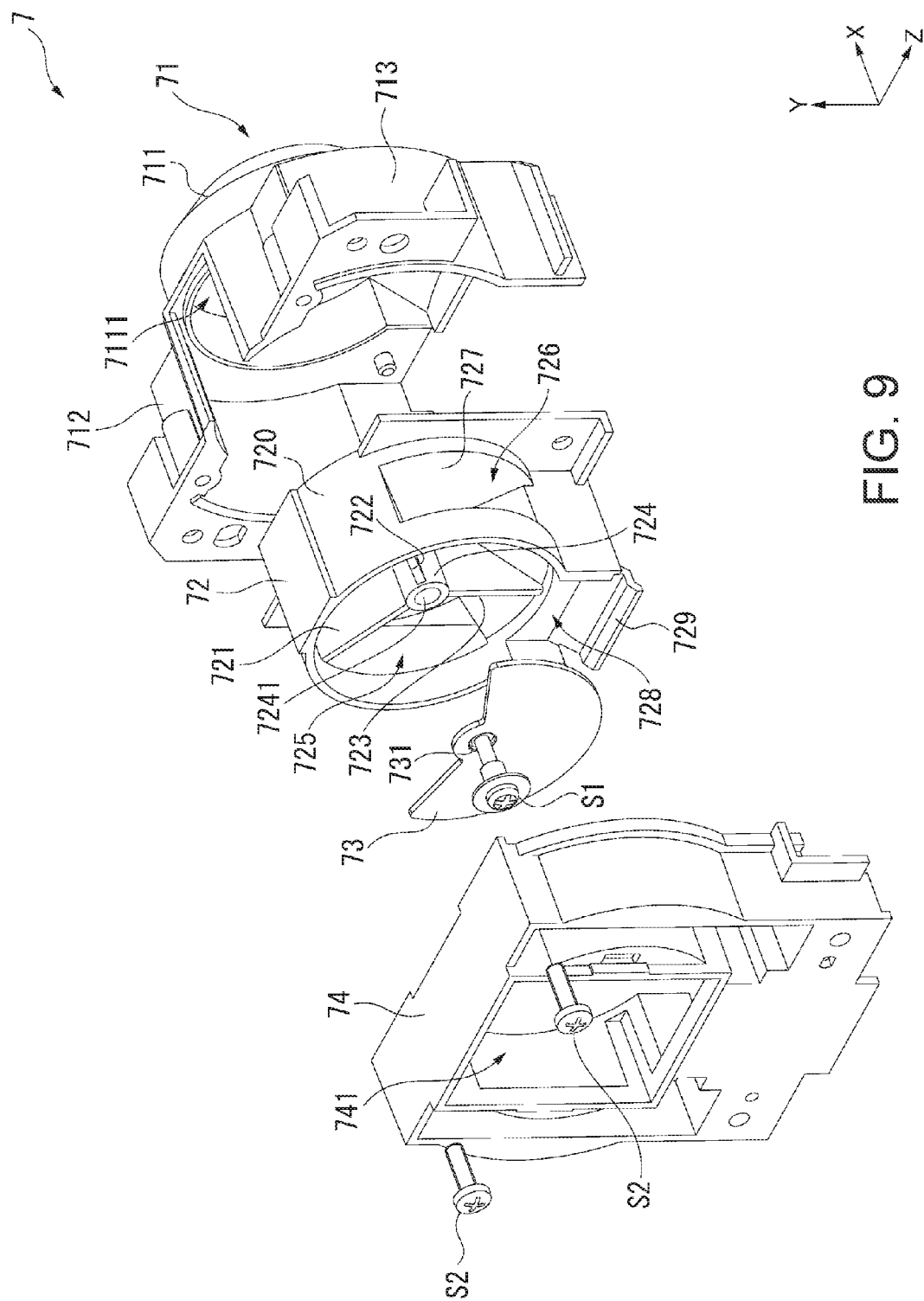
FIG. 9 is an exploded perspective view illustrating the diverging device according to the embodiment.

FIG. 7 is a perspective view of the diverging device 7 viewed from the side in the direction opposite to the X direction, FIG. 8 is a perspective view of the diverging device 7 viewed from a side in the direction opposite to the Y direction, and FIG. 9 is an exploded perspective view of the diverging device 7. Moreover, the diverging device 7 is provided in each of the light source devices 41A to 41D and the configurations are the same as each other. Thus, in FIGS. 7 to 9 and the following description, the diverging device 7 corresponding to the light source device 41A will be described.

The diverging device 7 is provided in each of the first and second lamp units 4A and 4B for each of the light source devices 41A to 41D and has a function of diverging the cooling gas supplied from cooling fans 91A to 91D of the cooling device 9 to the diverging device 7. Specifically, the diverging device 7 includes a plurality of duct portions (first to fourth duct portions D1 to D4) and has a function of changing a flow rate of the cooling gas introduced to inlets (first to third inlets R1 to R3) of the first to third duct portions D1 to D3 among them (see FIG. 10). As illustrated in FIGS. 7 to 9, the diverging device 7 includes a frame portion 71, a diverging section 72, a rotating plate 73, an inflow section 74, openings 75 to 78, the first duct portion D1, the second duct portion D2, the third duct portion D3, and the fourth duct portion D4.

Configuration of Frame Portion

As illustrated in FIG. 9, the frame portion 71 configures an outer frame of the diverging device 7 and includes a bottom portion 711, a left frame portion 712, and a right frame portion 713. The bottom portion 711 includes a concave portion 7111 that is recessed in the X direction and a function of guiding the cooling gas colliding with the concave portion 7111 on the side in the direction opposite to the Y direction. In addition, the left frame portion 712 configures the first duct portion D1 together with a cylindrical portion 720 described below. On the other hand, the right frame portion 713 configures the second duct portion D2 together with the cylindrical portion 720. Furthermore, the bottom portion 711 (concave portion 7111) configures the third duct portion D3 together with the cylindrical portion 720 and a shielding portion 727 described below.

Configuration of Diverging Section

The diverging section 72 has a function of diverging the cooling gas supplied via the inflow section 74. As illustrated in FIG. 9, the diverging section 72 includes the cylindrical portion 720, a first plate portion 721, a second plate portion 722, a third plate portion 723, a center portion 724, openings 725 and 726, the shielding portion 727, a concave portion 728, and an inclined portion 729. Among them, the first plate portion 721, the second plate portion 722, and the third plate portion 723 have a shape extending from the center portion 724 in which a hole portion 7241 is formed to an inner surface of the cylindrical portion 720 and are provided so as to divide the cylindrical portion 720 into three portions. Specifically, the first plate portion 721, the second plate portion 722, and the third plate portion 723 are provided for each of substantially 120° around the center portion 724. Thus, areas of a region surrounded by the first plate portion 721 and the second plate portion 722, a region surrounded by the second plate portion 722 and the third plate portion 723, a region surrounded by the first plate portion 721 and the third plate portion 723 are respectively set to be substantially the same as each other when viewing the cylindrical portion 720 described below from the X direction side.

The opening 725 is formed in the region surrounded by the first plate portion 721 and the third plate portion 723 and the opening 726 is formed in the region surrounded by the second plate portion 722 and the third plate portion 723 on an outer peripheral surface of the cylindrical portion 720.

The shielding portion 727 is disposed on the most X direction side of the diverging section 72 and has a function of shielding a region (hereinafter, may be referred to as the first inlet R1) surrounded by the first plate portion 721 and the third plate portion 723 and a region (hereinafter, may be referred to as the second inlet R2) surrounded by the second plate portion 722 and the third plate portion 723 when viewing the diverging section 72 from the X direction side. Therefore, if the cooling gas is supplied to the first inlet R1, the cooling gas flows out on the outside of the cylindrical portion 720 via the opening 725. Similarly, if the cooling gas is supplied to the second inlet R2, the cooling gas flows out on the outside of the cylindrical portion 720 via the opening 726.

On the other hand, since the shielding portion 727 is not provided in a region (hereinafter, may be referred to as the third inlet R3) surrounded by the first plate portion 721 and the second plate portion 722, the cooling gas supplied to the third inlet R3 circulates on the X direction side, that is, the frame portion 71 side via the inlet R3.

In addition, the concave portion 728 is formed on a side in the direction opposite to the Y direction in the outer peripheral surface of the cylindrical portion 720 and the inclined portion 729 is connected to the concave portion 728. The concave portion 728 configures the fourth inlet R4 together with the inflow section 74 described below.

The inclined portion 729 is a plate portion that is connected to an end portion of the concave portion 728 in a side opposite to the Y direction, inclines from a base end side of the inclined portion 729 to the inflow section 74 side, and extends in a direction opposite to the Y direction. That is, the inclined portion 729 includes a function of rectifying the cooling gas circulating from the fourth inlet R4 to the inclination direction.

Configuration of Rotating Plate

The rotating plate 73 is a substantially fan-shaped plate member and has a function of opening and closing at least apart of the first inlet R1, the second inlet R2, and the third inlet R3. As illustrated in FIGS. 7 to 9, the rotating plate 73 is fixed to the diverging section 72 to be rotatable. Specifically, a hole portion 731 having an inner diameter slightly greater than an inner diameter of a pin S1 is formed substantially at a center of the rotating plate 73 and is fixed by fitting the pin S1 into the hole portion 731 and the hole portion 7241 of the center portion 724. Therefore, the rotating plate 73 is rotated by its own weight according to the postures of the diverging device 7 and the projector 1 including the first and second lamp units 4A and 4B having the diverging device 7.

Configuration of Inflow Section

The inflow section 74 is connected to the cooling fan 91 described above and has a function of guiding the cooling gas supplied from the cooling fan 91 to the diverging section 72. The inflow section 74 is fixed to the frame portion 71 by screws S2 and a rectangular opening 741 is formed at a center of the inflow section 74. Therefore, the cooling gas supplied from the cooling fan 91 circulates in the diverging section 72 via the opening 741.

In addition, the inflow section 74 configures the fourth duct portion D4 together with the concave portion 728 and the inclined portion 729 of the diverging section 72.

Configuration of Opening

As illustrated in FIG. 8, the opening 75 to the opening 78 are formed on a side in the direction opposite to the Y direction of the diverging device 7. Among them, the opening 75 is positioned on a side opposite to the most Z direction when viewing the diverging device 7 on a side in the direction opposite to the Y direction and causes the cooling gas circulating through the first duct portion D1 to flow out on the outside of the diverging device 7. In addition, the opening 76 is positioned on the most Z direction side when viewing the diverging device 7 on a side in the direction opposite to the Y direction and causes the cooling gas circulating through the second duct portion D2 to flow out on the outside of the diverging device 7.

The opening 77 and the opening 78 are formed side by side in the X direction between the opening 75 and the opening 76. Among them, the opening 77 is positioned on the X direction side from the opening 78 and causes the cooling gas circulating through the third duct portion D3 to flow out to the outside of the diverging device 7. On the other hand, the opening 78 is positioned on a side opposite to the X direction from the opening 77 and causes the cooling gas circulating through the fourth duct portion D4 to flow out to the outside of the diverging device 7.

Moreover, as described below in detail, the openings 75 to 78 are respectively connected to openings 83 to 86 (see FIG. 15) of the light source device 41 and the cooling gas is supplied to the light source device 41 via the openings 75 to 78.

Circulating Path of Cooling Gas

Figure 10:
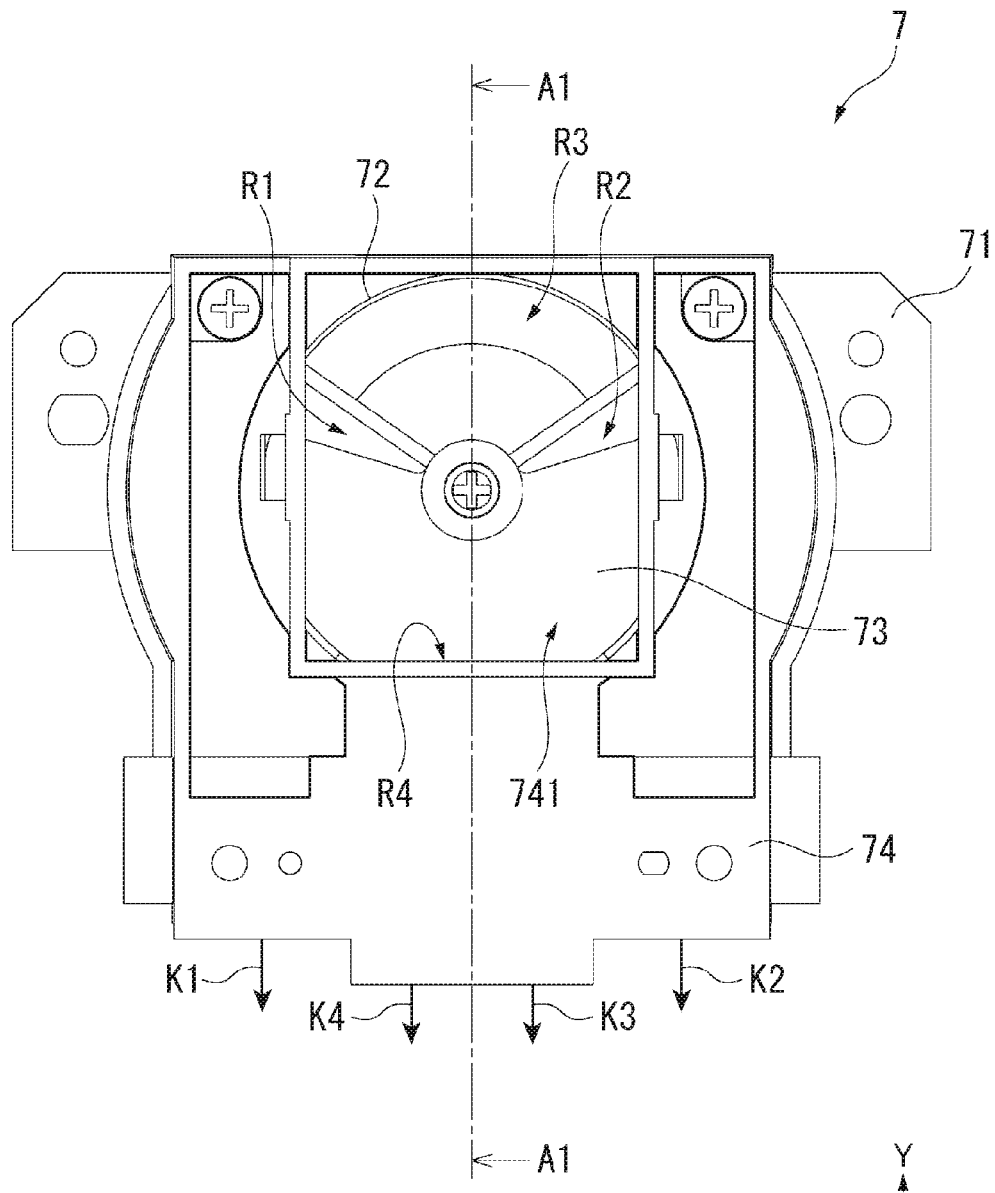
FIG. 10 is a front view illustrating the diverging device in a case in which the projector according to the embodiment is in a normal posture.
Figure 11:
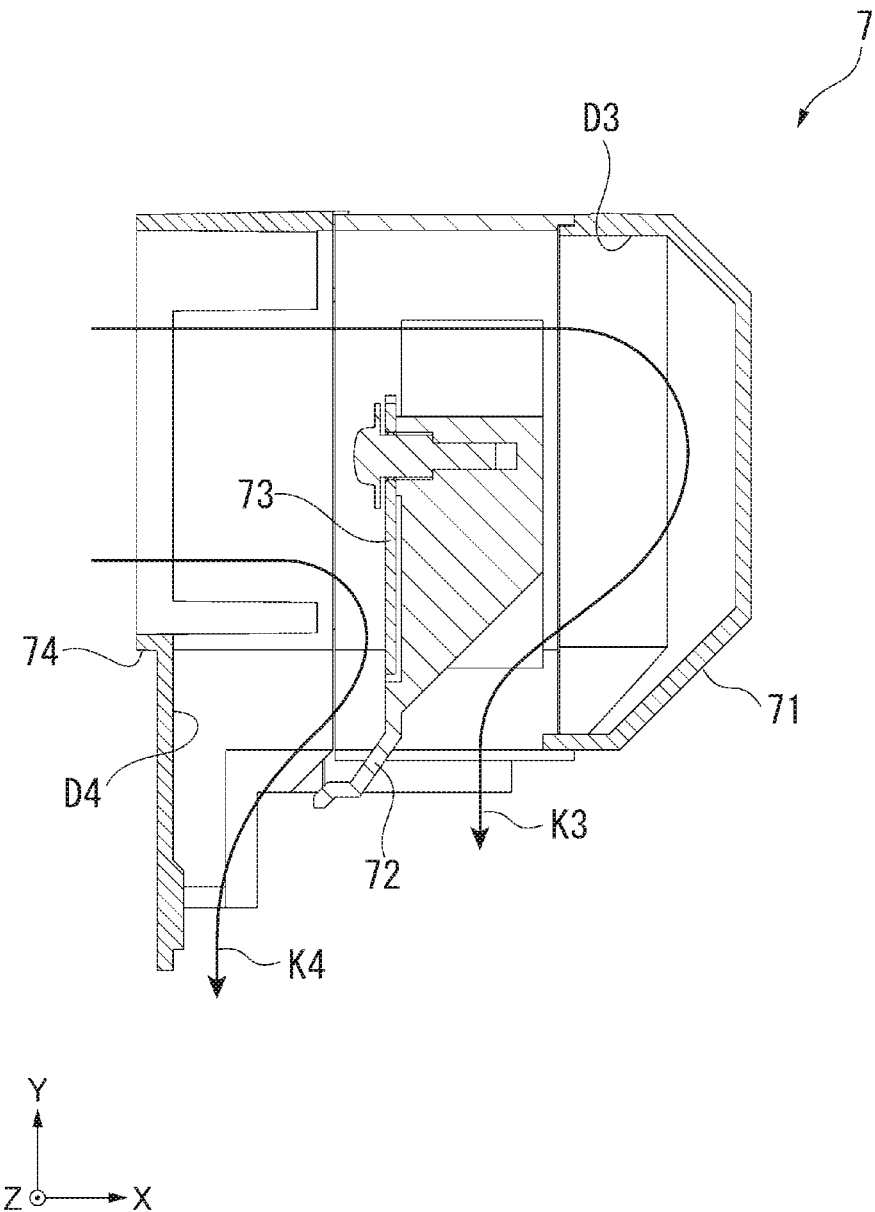
FIG. 11 is a sectional view illustrating the diverging device according to the embodiment.

FIG. 10 is a front view illustrating the diverging device 7 viewed from a side in the direction opposite to the X direction in a case in which the bottom portion 22 side of the projector 1 is the direction of gravity side and the diverging device 7 is mounted on the installation surface of the installation stand and the like, that is, is in the normal posture and FIG. 11 is a sectional view illustrating the diverging device 7 that is taken along a line A1-A1 in FIG. 10. Moreover, in the following description, the cooling gas flowing into the inflow section 74 is referred to as a cooling gas K, the cooling gas circulating through the first duct portion D1 is referred to as a cooling gas K1, the cooling gas circulating through the second duct portion D2 is referred to as a cooling gas K2, the cooling gas circulating through the third duct portion D3 is referred to as a cooling gas K3, and the cooling gas circulating through the fourth duct portion D4 is referred to as a cooling gas K4.

As described above, the cooling gas K circulating from the cooling fan 91 is diverged and circulates on the inside of the diverging device 7.

Here, if the projector 1 is in the normal posture, the rotating plate 73 is rotated by its own weight and as illustrated in FIGS. 10 and 11, shields most regions of the first inlet R1 and the second inlet R2. Therefore, if the cooling gas K flows into on the inside of the diverging device 7 via the inflow section 74, the cooling gas K is mainly guided to the third inlet R3 of the third duct portion D3 that is in the full opened state and as illustrated in FIG. 11, the cooling gas K3 circulates through the third duct portion D3, and flows out from the opening 77. In addition, since the fourth inlet R4 of the fourth duct portion D4 is not shielded by the rotating plate 73, some of the cooling gas K always flows into the fourth inlet R4, and the cooling gas K4 circulates through the fourth duct portion D4, and flows out from the opening 78.

Figure 12:
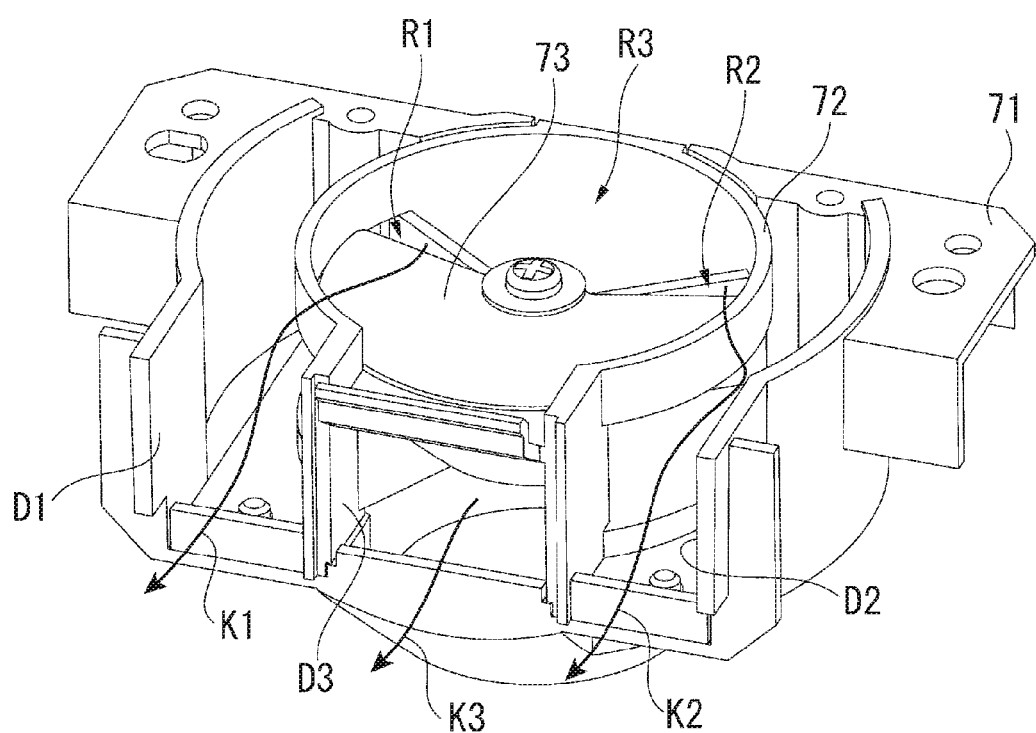
FIG. 12 is a view illustrating a flow path of cooling gas circulating the diverging device according to the embodiment.
Figure 12:

FIG. 12 is a perspective view illustrating flows of the cooling gases K1 and K2 circulating through the diverging device 7. Moreover, in FIG. 12, in order to clarify the flows of the cooling gases K1 and K2 circulating through the diverging device 7, the diverging device 7 is illustrated in a state in which the inflow section 74 is removed.

In addition, in a case in which the projector 1 is in the normal posture, all regions of the first inlet R1 and the second inlet R2 are shielded by the rotating plate 73. Thus, as illustrated in FIG. 12, the cooling gas K1 flowing from a part of the first inlet R1 into the first duct portion D1 circulates through the first duct portion D1 and flows out from the opening 75. Similarly, as illustrated in FIG. 12, the cooling gas K2 flowing from a part of the second inlet R2 into the second duct portion D2 circulates through the second duct portion D2 and flows out from the opening 76.

As described above, if the projector 1 is in the normal posture, a flow rate of the cooling gas K3 circulating through the third duct portion D3 is greater than a flow rate of each of the cooling gases K1 and K2 circulating through the first duct portion D1 and the second duct portion D2.

FIG. 13 is a perspective view illustrating flows of the cooling gases K1 and K3 circulating through the diverging device 7. Moreover, similar to FIG. 12, FIG. 13 illustrates the diverging device 7 in a state in which the inflow section 74 is removed.

If the projector 1 is installed in a state (hereinafter, may be referred to as the downward posture) of being rotated by 90° in a counterclockwise direction from the normal posture when viewed from the X direction side, as illustrated in FIG. 13, all regions of the inlet R2 and most regions of the inlet R3 are shielded by the rotating plate 73. Therefore, if the cooling gas K flows into the inside of the diverging device 7 via the inflow section 74, the cooling gas K is mainly guided to the inlet R1 of the first duct portion D1 that is in a full opened state and as illustrated in FIG. 13, the cooling gas K1 circulates through the first duct portion D1 and flows out from the opening 75. In addition, since the inlet R4 of the fourth duct portion D4 is not shielded by the rotating plate 73, some of the cooling gas K always flows into the inlet R4, and the cooling gas K4 circulates through the fourth duct portion D4, and flows out from the opening 78.

In addition, as illustrated in FIG. 13, the cooling gas K3 flowing from the inlet R3 into the third duct portion D3 circulates through the third duct portion D3 and flows out from the opening 77.

As described above, if the projector 1 is in the downward posture, the flow rate of the cooling gas K1 circulating through the first duct portion D1 is greater than the flow rate of the cooling gas K3 circulating through the third duct portion D3.

FIG. 14 is a perspective view illustrating flows of the cooling gases K2 and K3 circulating through the diverging device 7. Moreover, similar to FIGS. 12 and 13, FIG. 14 illustrates the diverging device 7 in a state in which the inflow section 74 is removed.

If the projector 1 is installed in a state (hereinafter, may be referred to as the upward posture) of being rotated by 90° in a clockwise direction from the normal posture when viewed from the X direction side, as illustrated in FIG. 14, all regions of the inlet R1 and most regions of the inlet R3 are shielded by the rotating plate 73. Therefore, if the cooling gas K flows into the inside of the diverging device 7 via the inflow section 74, the cooling gas K is mainly guided to the inlet R2 of the second duct portion D2 that is in a full opened state and as illustrated in FIG. 14, the cooling gas K2 circulates through the second duct portion D2 and flows out from the opening 76. In addition, since the inlet R4 of the fourth duct portion D4 is not shielded by the rotating plate 73, some of the cooling gas K always flows into the inlet R4, and the cooling gas K4 circulates through the fourth duct portion D4, and flows out from the opening 78.

In addition, as illustrated in FIG. 14, the cooling gas K3 flowing from the inlet R3 into the third duct portion D3 circulates through the third duct portion D3 and flows out from the opening 77.

As described above, if the projector 1 is in the upward posture, the flow rate of the cooling gas K2 circulating through the second duct portion D2 is greater than the flow rate of the cooling gas K3 circulating through the third duct portion D3. That is, the projector 1 is configured to appropriately shield the inlets R1 to R3 and to adjust the flow rate of the cooling air circulating through each of the duct portions D1 to D3 by rotating the rotating plate 73.

Configuration of Light Source Device

Figure 15:
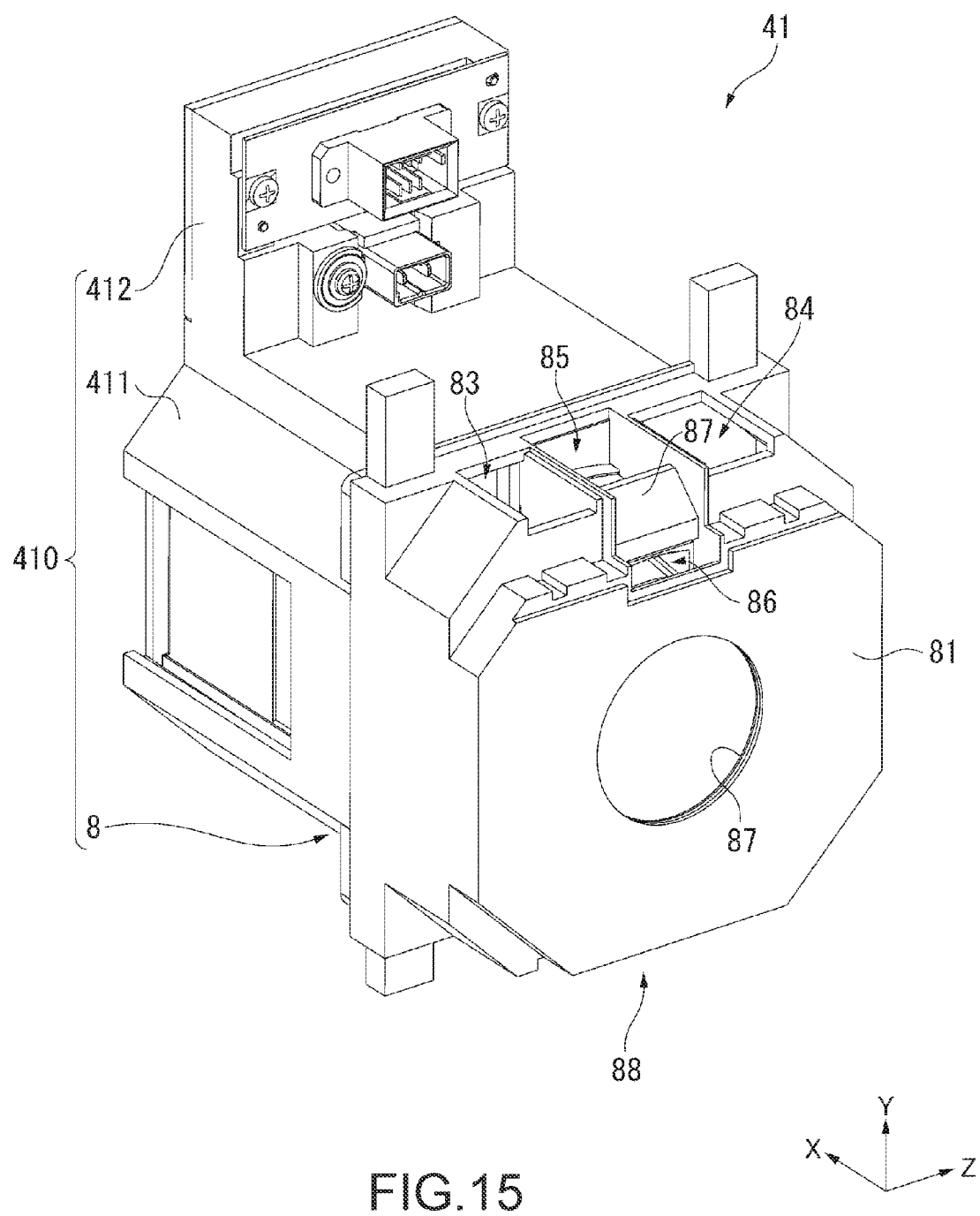
FIG. 15 is a perspective view illustrating the light source device according to the embodiment.

FIG. 15 is a perspective view of the light source device 41. Moreover, in FIG. 15, the description, in which the X direction, the Y direction, and the Z direction are used in the light source device 41A mounted on the first lamp unit 4A, is given.

Figure 19:
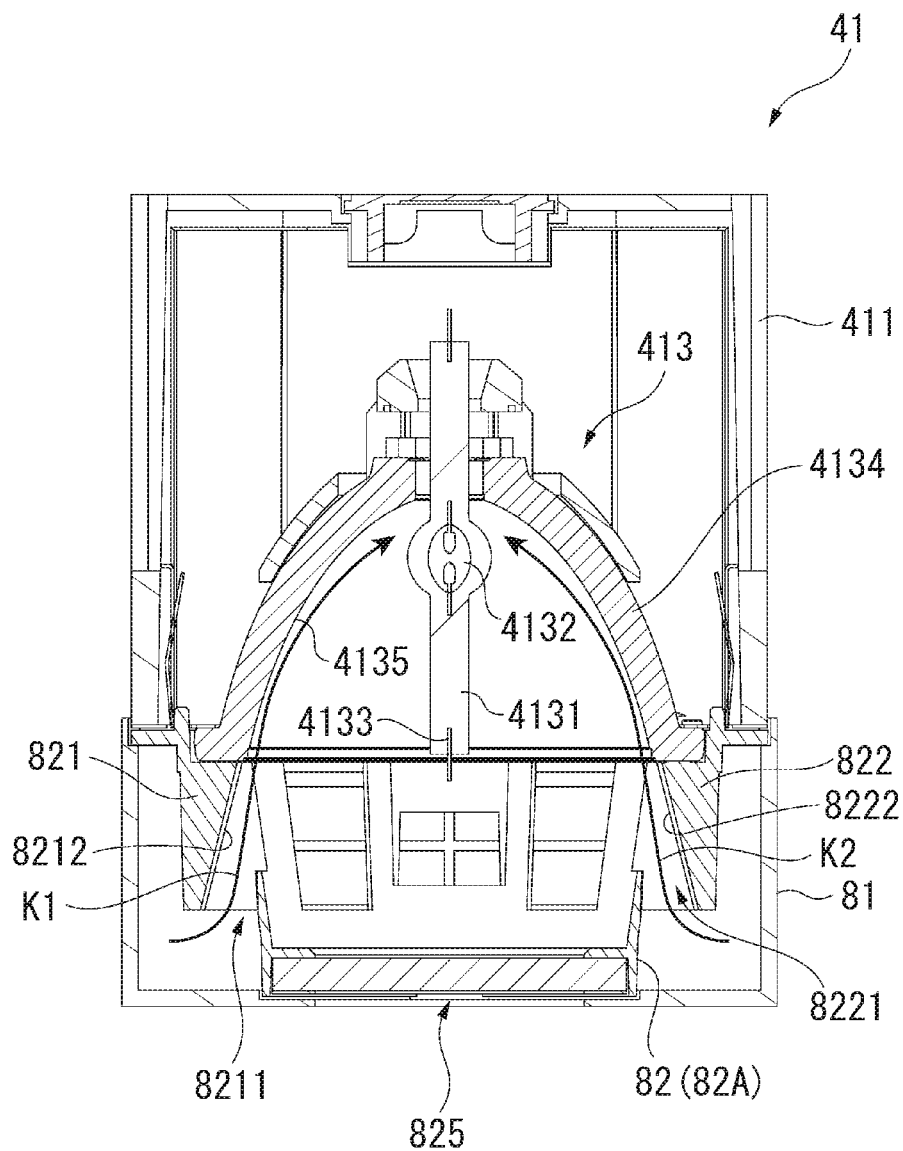
FIG. 19 is a sectional view illustrating a cross section of the light source device according to the embodiment.

The light source device 41 (41A) includes a storage body 410 storing a light source lamp 413 (see FIG. 19). The housing 410 includes a first housing 411 and a second housing 8. A mounting portion 412 connected to the connecting portion 42A of the first lamp unit 4A is fixed to an end portion of the first housing 411 on the Y direction side. In addition, the second housing 8 is connected so as to cover a surface of the first housing 411 on the side in the direction opposite to the X direction.

The light source lamp 413 having a light emitting tube 4131 and a reflector 4134 is stored on an inside of the first housing 411. Moreover, a configuration of the first housing 411 will be described later.

Configuration of Second Housing

Figure 16:
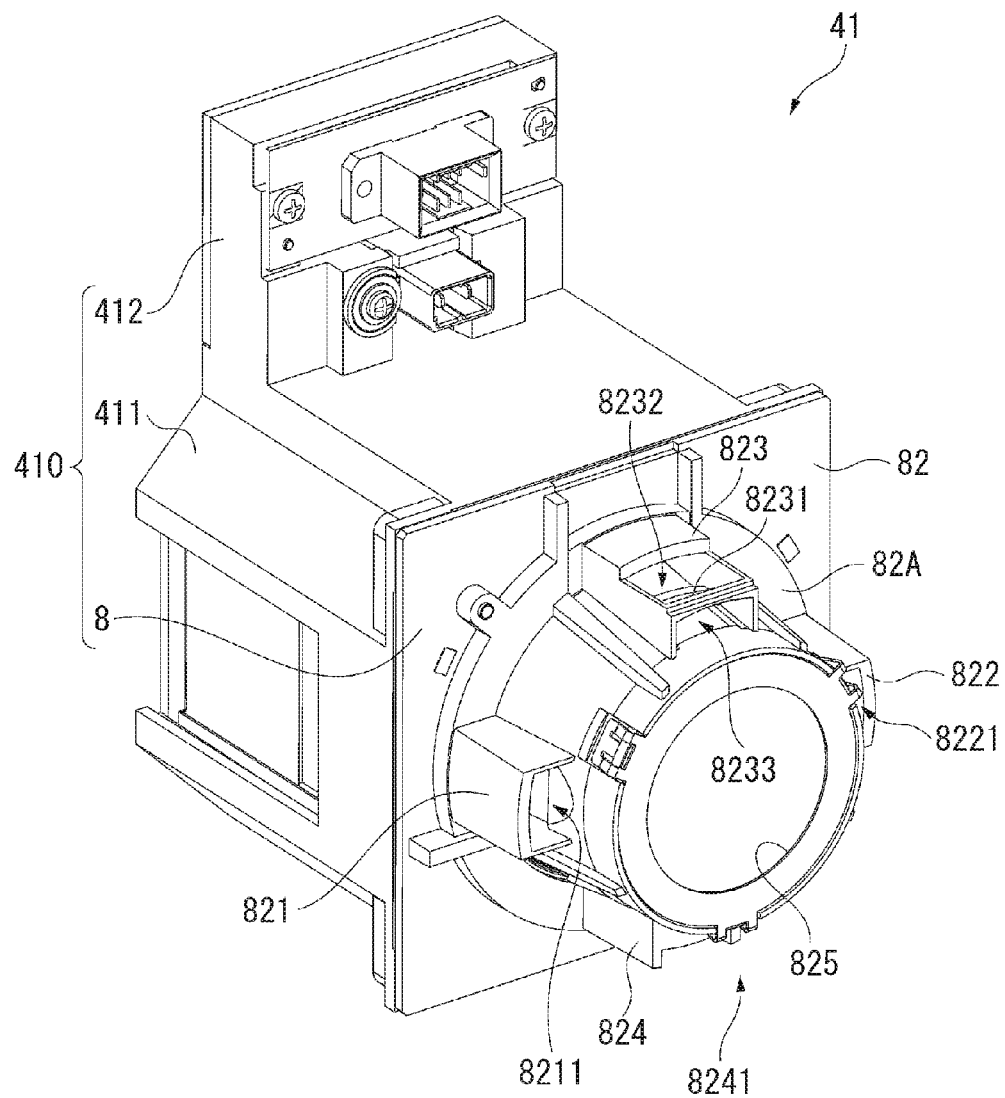
FIG. 16 is a perspective view illustrating the light source device in a state in which an air guiding member according to the embodiment is removed.
Figure 17:
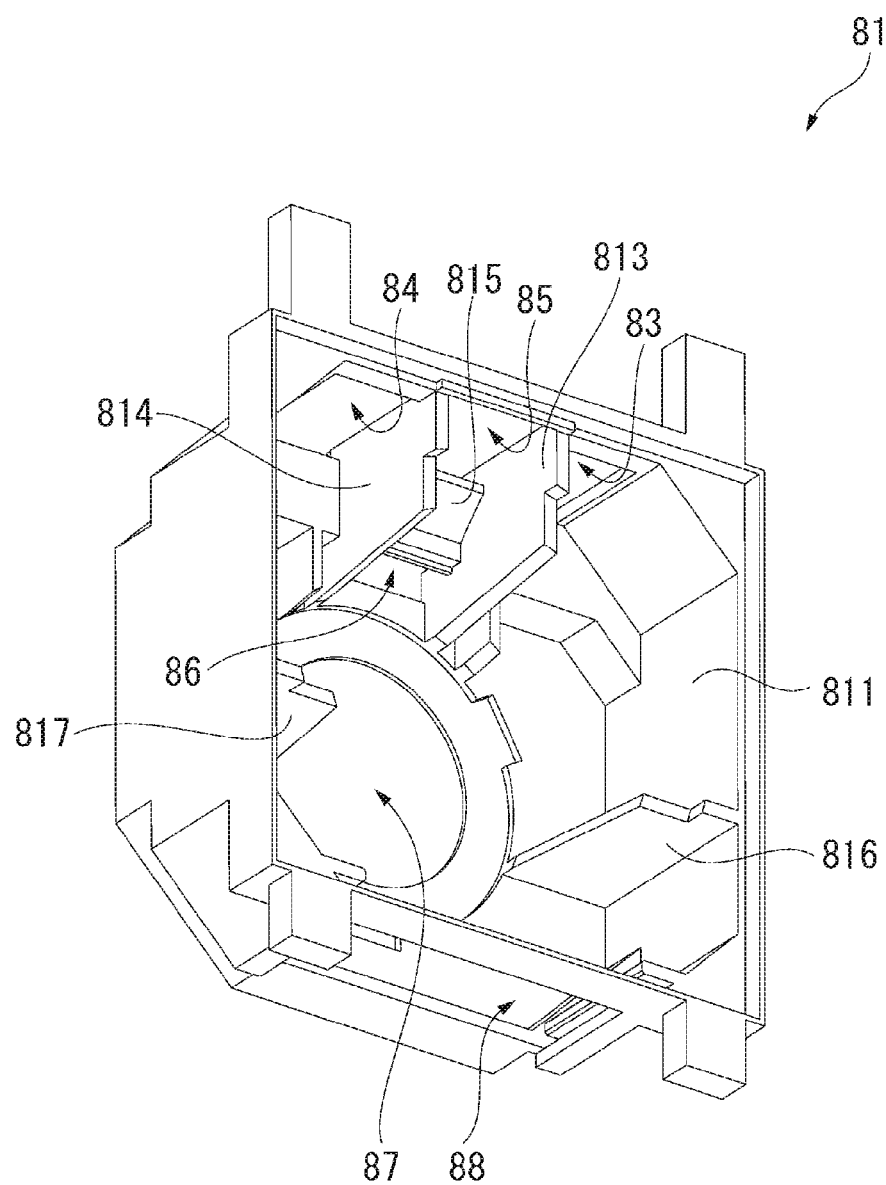
FIG. 17 is a perspective view illustrating the air guiding member according to the embodiment.

FIG. 16 is a perspective view illustrating the light source device 41 in a state in which an air guiding member 81 of the second housing 8 is removed and FIG. 17 is a perspective view illustrating the air guiding member 81 viewed from the side in the direction opposite to the X direction.

As illustrated in FIGS. 16 and 17, the second housing 8 includes the air guiding member 81, a cover member 82, a first opening 83, a second opening 84, a third opening 85, a fourth opening 86, an opening 87, and an outlet 88.

Among them, the first opening 83, the second opening 84, and the third opening 85 are disposed on an end portion of the second housing 8 on the Y direction side, side by side along the Z direction. In addition, the fourth opening 86 is formed on the side in the direction opposite to the X direction of the third opening 85 disposed between the first opening 83 and the second opening 84.

Moreover, each of the openings 75 to 78 of the diverging device 7 is connected to each of the openings 83 to 86. Thus, the cooling gas diverged by the diverging device 7 is supplied to an inside of the light source device 41 via the openings 83 to 86.

The opening 87 is formed substantially at a center of a surface of the second housing 8 on the side in the direction opposite to the most X direction and emits light emitted from the light source lamp 413 to the optical path changing device 5 via the opening 87.

The outlet 88 is formed on a surface of the second housing 8 on the side in direction opposite to the Y direction and has a function of discharging the cooling gas flowing from each of the openings 83 to 86 and circulating on the inside of the storage body 410.

Configuration of Air Guiding Member

As illustrated in FIG. 17, the air guiding member 81 includes an outer frame portion 811, vertical plate portions 813 and 814, a rectifying section 815, and horizontal plate portions 816 and 817 in addition to the first to fourth openings 83 to 86, the opening 87, and the outlet 88. Among them, the outer frame portion 811 configures an outer frame of the air guiding member 81 and is formed in a hollow shape. In addition, a plurality of screw hole portions (not illustrated) are formed in the outer frame portion 811. The air guiding member 81 is fixed to the cover member 82 by screwing screws (not illustrated) into the hole portions.

Furthermore, the vertical plate portions 813 and 814, the rectifying section 815, and the horizontal plate portions 816 and 817 are formed on an inside of the outer frame portion 811. Specifically, the vertical plate portion 813 is a plate portion extending from between the first opening 83 and the third opening 85 on the side in the direction opposite to the Y direction. In addition, the vertical plate portion 814 is a plate portion extending between the second opening 84 and the third opening 85 in the direction opposite to the Y direction. The vertical plate portions 813 and 814 configure a part of a fifth duct portion D5, a sixth duct portion D6, and a seventh duct portion D7 described below.

The rectifying section 815 has a function of guiding the cooling gas to any one of a reflection surface 4135 of the reflector 4134 and a distal end portion 4133 (see FIG. 19) of the light emitting tube 4131 together with a bending portion 8231 described below. Specifically, the rectifying section 815 is provided between the vertical plate portion 813 and the vertical plate portion 814, is inclined from an proximal end portion side of the rectifying section 815 on the side in the direction opposite to the X direction, a distal end portion thereof has a shape extending in the direction opposite to the Y direction, and the bending portion 8231 is connected to the distal end portion. The rectifying section 815 and the bending portion 8231 configure a part of the seventh duct portion D7 and an eighth duct portion D8 described below.

The horizontal plate portion 816 is a plate member formed in a middle portion of the outer frame portion 811 in a surface on a side in the direction opposite to the Z direction. In addition, the horizontal plate portion 816 configures apart of the fifth duct portion D5 described below. In addition, the horizontal plate portion 817 is a plate member formed in a middle portion in a surface on the Z direction side of the outer frame portion 811. The horizontal plate portion 817 configures apart of the sixth duct portion D6 described below.

Configuration of Cover Member

The cover member 82 has a function of covering the first housing 411 on the side in the direction opposite to the X direction. The cover member 82 includes a cylindrical protrusion portion 82A protruding on a side in the direction opposite to the X direction. As illustrated in FIG. 16, the protrusion portion 82A has a first introduction portion 821, a second introduction portion 822, a third introduction port ion 823, and a discharging portion 824. Among them, the first introduction portion 821, the second introduction portion 822, and the third introduction portion 823 are provided for each 90° in a direction orthogonal to a center axis (center axis along the X direction) of light emitted from the light emitting tube 4131 of the light source lamp 413 in the protrusion portion 82A and emitted by being reflected by the reflector 4134. Specifically, the first introduction portion 821 is provided on the protrusion portion 82A side in the direction opposite to the Z direction and the second introduction portion 822 is disposed in a position facing the first introduction portion 821. In addition, the third introduction portion 823 is provided between the first introduction portion 821 and the second introduction portion 822, that is, on the protrusion portion 82A side on the most Y direction. Furthermore, the discharging portion 824 is provided in a position facing the third introduction portion 823 in the protrusion portion 82A.

The first introduction portion 821 and the second introduction portion 822 respectively include an inlet 8211 and an inlet 8221, and the cooling gas flows from the inlets 8211 and 8221. That is, the cooling gas is supplied to the light source lamp 413 stored in the first housing 411 via the inlets 8211 and 8221.

The third introduction portion 823 includes the bending portion 8231 connected to the rectifying section 815 within the third introduction portion 823. The bending portion 8231 is a plate portion inclining in a direction opposite to the rectifying section 815. In addition, the third introduction portion 823 includes an inlet 8232 on the Y direction side and includes an inlet 8233 on the side in the direction opposite to the X direction. The cooling gas flows into each of the inlets 8232 and 8233. That is, the cooling gas is supplied to the light source lamp 413 stored in the first housing 411 via the inlets 8232 and 8233.

The discharging portion 824 includes an outlet 8241 and the cooling gas cooling the light source lamp 413 is discharged from the outlet 8241. That is, the cooling gas flows from each of the inlets 8211, 8221, 8232, and 8233 into the first housing 411 and the cooling gas is discharged from the outlet 8241.

Configuration of First Housing and Light Source Lamp

Figure 18:
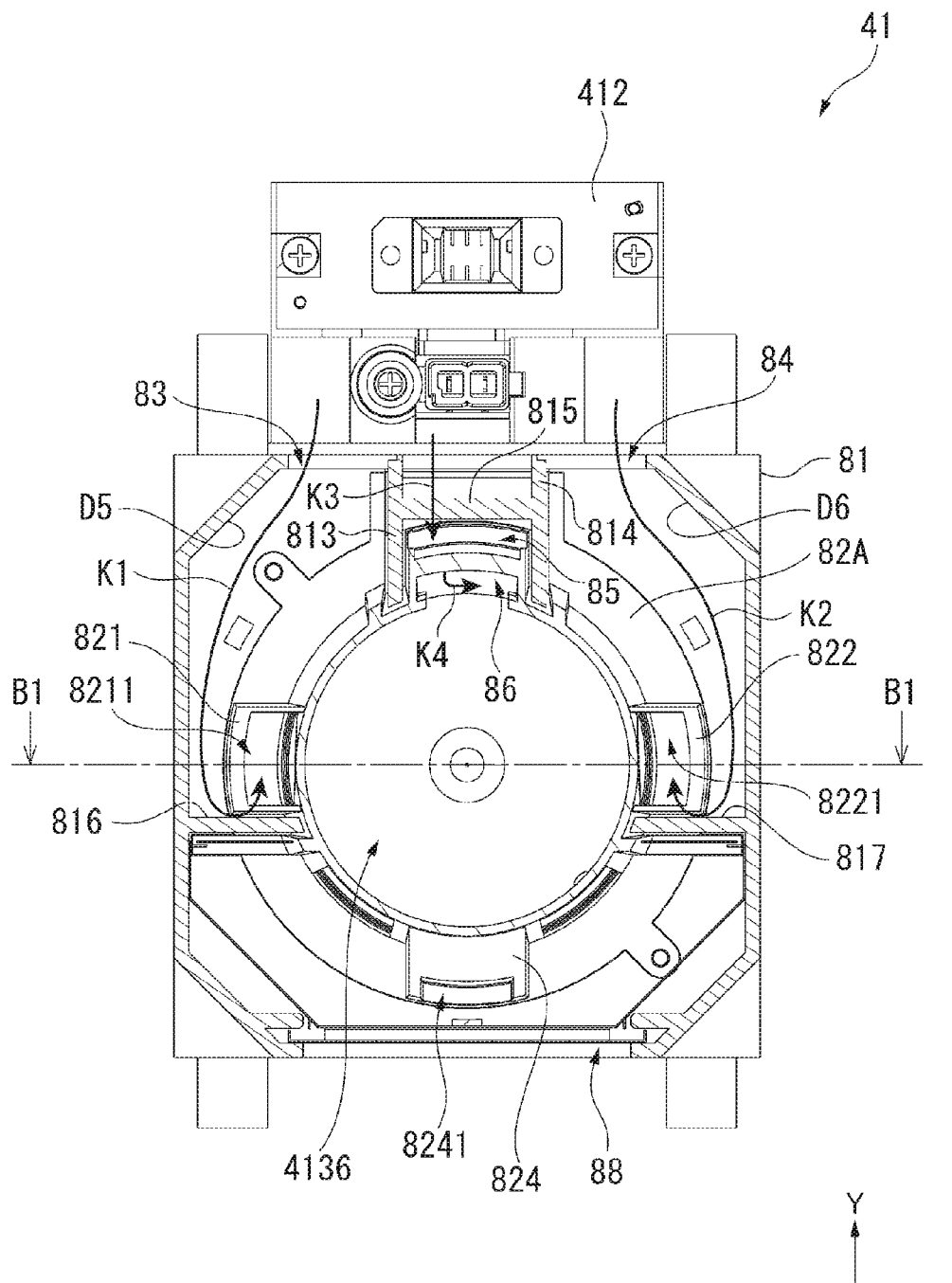
FIG. 18 is a sectional view illustrating a cross section of the light source device according to the embodiment.

FIG. 18 is a sectional view of a YZ plane of the light source device 41 (second housing 8) and FIG. 19 is a sectional view illustrating cross section along a line B1-B1 of the light source device 41 in FIG. 18.

Here, before describing a circulating flow path of the cooling gas, the first housing 411 and the light source lamp 413 stored in the first housing 411 are described. As illustrated in FIG. 19, the light source lamp 413 includes the light emitting tube 4131 and the reflector 4134 fixed to a sealing portion positioned on a proximal end side of the light emitting tube 4131. Among them, the reflector 4134 emits the light emitted from a light emitting section 4132 of the light emitting tube 4131 by aligning the light in one direction and in the embodiment, is configured as an elliptical reflector in which the reflection surface 4135 is elliptical. In addition, an opening 4136, through which light reflected on the reflection surface 4135 of the reflector 4134 and light directly incident from the light emitting section 4132 transmit, is formed on a surface on the first housing 411 side in the direction opposite to the X direction.

In addition, the first introduction portion 821 is connected to an end portion of the reflector 4134 on the side in the direction opposite to the X direction. The first introduction portion 821 is formed so that a dimension in a direction along the Z direction is increased according to advancing on the X direction side. Therefore, an inner peripheral surface 8212 of the first introduction portion 821 is continuous to the reflection surface 4135 of the reflector 4134. Similarly, the second introduction portion 822 is connected to an end portion of the reflector 4134 on the side in the direction opposite to the X direction. The second introduction portion 822 is formed so that a dimension in a direction along the Z direction is increased according to advancing on the X direction side. Therefore, the inner peripheral surface 8222 of the second introduction portion 822 is continuous to the reflection surface 4135 of the reflector 4134.

Circulating Flow Path of Cooling Gas

Next, a circulating flow path of the cooling gases K1 to K4 diverged by the diverging device 7 flowing out from the openings 75 to 78 of the diverging device 7 will be described.

First, as illustrated in FIG. 18, the cooling gas K1 flowing from the opening 75 circulates through the fifth duct portion D5, which is configured of a surface of the air guiding member 81 on the X direction side, a surface on the side in the direction opposite to the Z direction, the vertical plate portion 813, the horizontal plate portion 816, and a surface of the cover member 82 on the side in the direction opposite to the X direction, toward the side in the direction opposite to the Y direction. Then, the cooling gas K1 collides with the horizontal plate portion 816 of the fifth duct portion D5 and flows into the inlet 8211 of the first introduction portion 821.

On the other hand, as illustrated in FIG. 18, the cooling gas K2 flowing from the opening 76 circulates through the sixth duct portion D6, which is configured of the surface of the air guiding member 81 on the X direction side, a surface on the Z direction side, the vertical plate portion 814, the horizontal plate portion 817, and the surface of the cover member 82 on the side in the direction opposite to the X direction, toward the side in the direction opposite to the Y direction. Then, the cooling gas K2 collides with the horizontal plate portion 817 of the sixth duct portion D6 and flows into the inlet 8221 of the second introduction portion 822.

Then, the cooling gas K1 flowing from the inlet 8211 of the first introduction portion 821 into the inside of the first housing 411 circulates along the inner peripheral surface 8212 of the first introduction portion 821 and the reflection surface 4135 of the reflector 4134 continuous to the inner peripheral surface 8212. On the other hand, the cooling gas K2 flowing from the inlet 8221 of the second introduction portion 822 into the inside of the first housing 411 circulates along the inner peripheral surface 8222 of the second introduction portion 822 and the reflection surface 4135 of the reflector 4134 continuous to the inner peripheral surface 8222.

Here, if the projector 1 is in the downward posture, since a position, in which the first introduction portion 821 is provided, becomes an upper portion of the light source lamp 413, heat is likely to be in the most increase in an upper portion (side in the direction opposite to the Z direction) of the light emitting section 4132. In this case, since the flow rate of the cooling gas K1 circulating through the first duct portion D1 by the diverging device 7 is set to be the greatest, the cooling gas K1 is efficiently circulated in the upper portion of the light emitting section 4132.

On the other hand, if the projector 1 is in the upward posture, since a position, in which the second introduction portion 822 is provided, becomes the upper portion of the light source lamp 413, heat is likely to be in the most increase in the upper portion (Z direction side) of the light emitting section 4132. In this case, since the flow rate of the cooling gas K2 circulating through the second duct portion D2 by the diverging device 7 is set to be the greatest, the cooling gas K2 is efficiently circulated in the upper portion of the light emitting section 4132.

Figure 20:
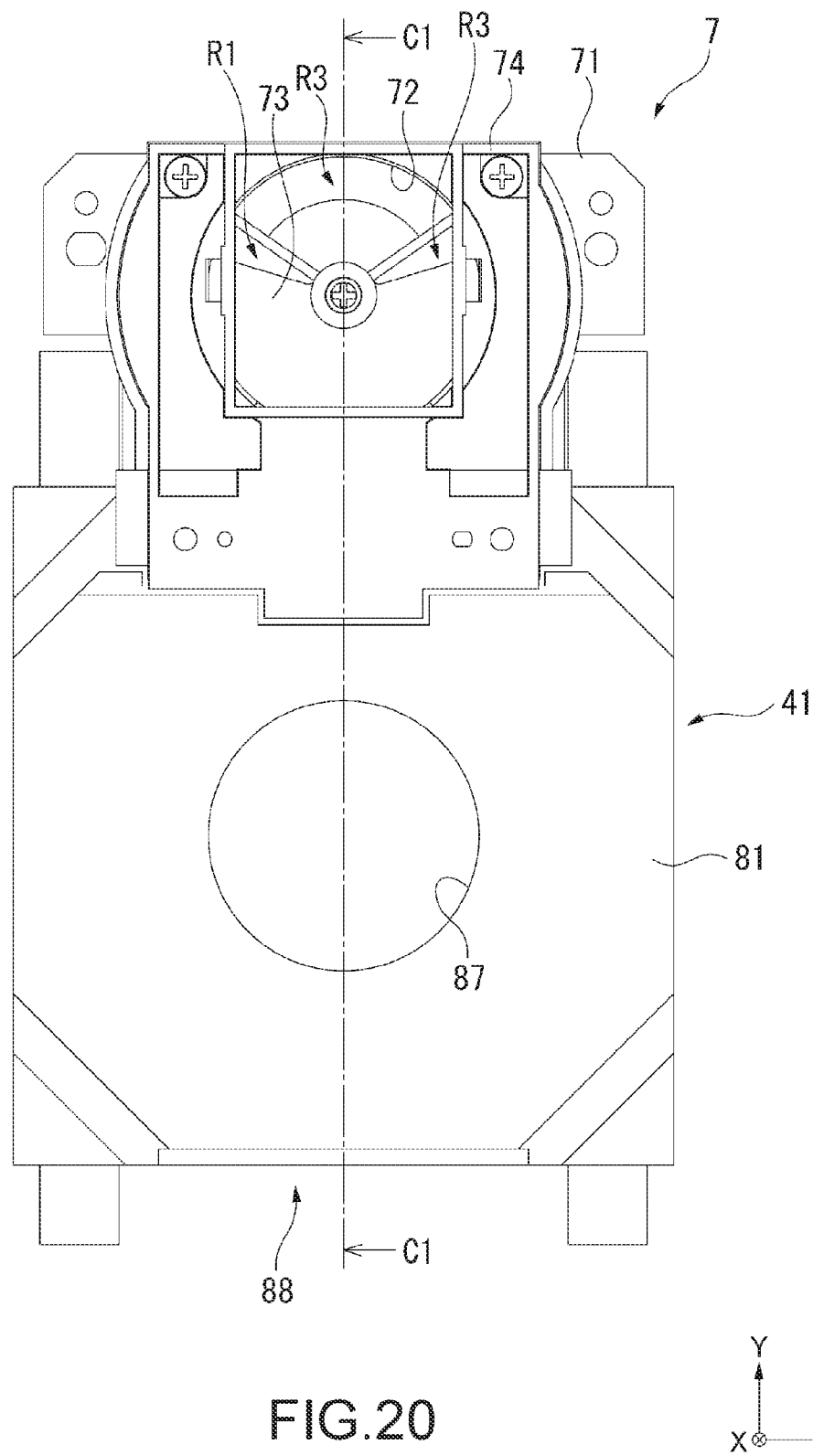
FIG. 20 is a plan view illustrating a state in which the light source device and the diverging device according to the embodiment are connected.
Figure 21:
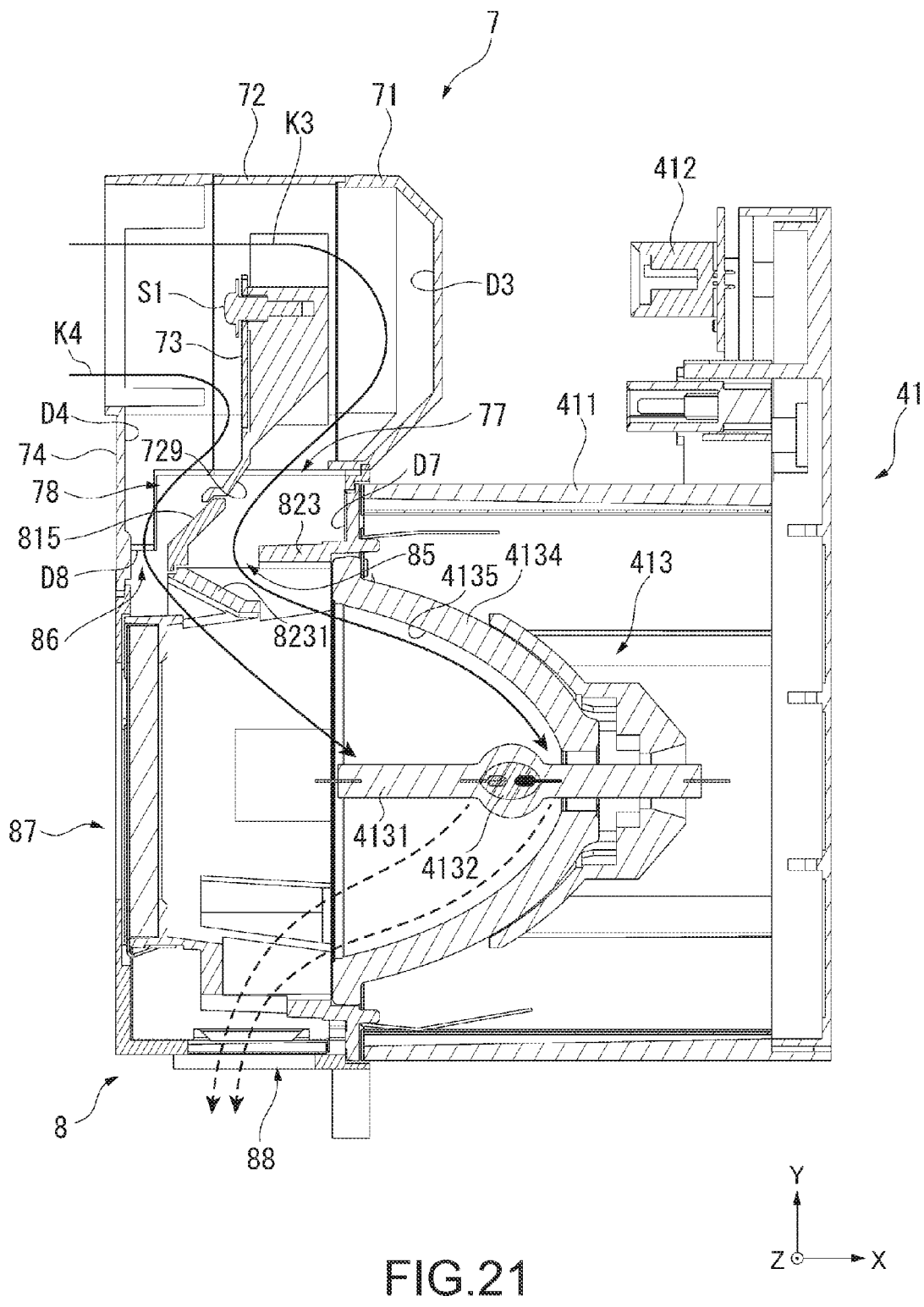
FIG. 21 is a sectional view illustrating a cross section of the light source device and the diverging device according to the embodiment.

FIG. 20 is a plan view illustrating a state in which the diverging device 7 and the light source device 41 are connected and FIG. 21 is a sectional view illustrating the cross section along a line C1-C1 of the diverging device 7 and the light source device 41 of FIG. 20. Moreover, FIGS. 20 and 21 illustrate the diverging device 7 and the light source device 41 in a case in which the projector 1 is in the normal posture.

As illustrated in FIG. 21, the cooling gas K3 flowing from the opening 77 via the third duct portion D3 of the diverging device 7 circulates through the seventh duct portion D7 in a substantially L shape which is configured of the vertical plate portions 813 and 814, and the rectifying section 815 of the air guiding member 81 and the third introduction portion 823 and the bending portion 8231 of the cover member 82. Specifically, the cooling gas K3 circulates from the third duct portion D3 to the seventh duct portion D7 and collides with the bending portion 8231 configuring the seventh duct portion D7. Therefore, the substantially L-shaped flow path of the cooling gas K3 is changed on the reflector 4134 side and the cooling gas K3 flows into the inside of the first housing 411 along the reflection surface 4135 of the reflector 4134. Therefore, the flow path of the cooling gas K3 from the opening 741 of the inflow section 74 to the reflector 4134 becomes a substantially S shape viewed from the Z direction side.

Here, if the projector 1 is in the normal posture, since a position, in which the third introduction portion 823 is provided, becomes the upper portion of the light source lamp 413, heat is likely to be in the most increase in the upper portion (Y direction side) of the light emitting section 4132. In this case, since the flow rate of the cooling gas K3 circulating through the third duct portion D3 by the diverging device 7 is set to be the greatest, the cooling gas K3 is efficiently circulated in the upper portion of the light emitting section 4132.

As illustrated in FIG. 21, the cooling gas K4 flowing from the opening 78 via the fourth duct portion D4 of the diverging device 7 circulates through the eighth duct portion D8 in a substantially L shape which is configured of a surface of the inflow section 74 on the X direction side, a surface of the air guiding member 81 on the X direction side, the rectifying section 815, and the bending portion 8231 of the cover member 82. Specifically, the cooling gas K4 circulates from the fourth duct portion D4 to the eighth duct portion D8 and collides with the surface of the inflow section 74 on the X direction side configuring the eighth duct portion D8. Therefore, the substantially L-shaped flow path of the cooling gas K4 is changed on the light emitting tube 4131 side and the cooling gas K4 flows into the inside of the first housing 411 along the bending portion 8231. Therefore, the flow path of the cooling gas K4 from the opening 741 of the inflow section 74 to the distal end portion 4133 of the light emitting tube 4131 becomes a substantially S shape viewed from the Z direction side. The cooling gas K4 always circulates in the distal end portion 4133 of the light emitting tube 4131 even if the projector 1 is in any of the upward posture and the downward posture in addition to a case in which the projector 1 is in the normal posture.

Since a lead wire (not illustrated) is wound in the distal end portion 4133, a temperature of the distal end portion 4133 is likely to rise. In this case, since the cooling gas K4 is always circulated in the fourth duct portion D4 by the diverging device 7, the cooling gas K4 is efficiently circulated in the distal end portion 4133 of the light emitting tube 4131.

In this way, the cooling gas K circulating from the cooling fan 91 is formed such that the flow rates of the cooling gas K1 to K3 flowing into the first to third duct portions D1 to D3 according to the posture of the projector 1 are adjusted by the diverging device 7, the cooling gases K1 to K3 of the adjusted flow rate and the cooling gas K4 flowing into the fourth duct portion D4 are supplied to the light source device 41, and efficiently cool the light source device 41. Then, as indicated by a broken line in FIG. 21, the cooling gases K1 to K4 after cooling the light source lamp 413 (light emitting section 4132 and the distal end portion 4133) is discharged from the outlet 88 to the outside of the storage body 410.

According to the projector 1 of the above-described one embodiment, it is possible to achieve the following advantages.

Since the diverging device 7 is provided in each of the first lamp unit 4A and the second lamp unit 4B, it is possible to reliably reduce a size of the light source device 41 compared to a case in which the diverging device 7 is provided in the light source device 41. In addition, it is possible to guide the cooling gases K1 to K3 to at least one opening of the plurality of openings 83 to 85 provided in the storage body 410 of the light source device 41. Thus, it is possible to selectively supply the cooling gases K1 to K3 of the cooling gas K to desired duct portions D1 to D3.

In addition, the diverging device 7 is provided in each of the light source devices 41A to 41D. Thus, it is possible to reduce the size of the diverging device 7 compared to a diverging device performing divergence of the cooling gas K to the plurality of light source devices 41A to 41D. Therefore, it is possible to reduce the size of the lighting device 31.

Here, the light source lamp 413 of the light source device 41 is configured of the light emitting tube 4131 and the reflector 4134. Thus, the upper portion (upper portion of the light emitting section 4132) of the light emitting tube 4131 is likely to attract heat due to light emission more than the lower portion (lower portion of the light emitting section 4132) and a temperature difference occurs between the upper portion and the lower portion. Such a local temperature difference causes deterioration such as white turbidity and deformation of glass configuring the light emitting tube 4131, and is a factor to shorten the life of the light emitting tube 4131. In contrast, according to the embodiment, since the cooling gases K1 to K3 is mainly guided to the position in which heat of the light source lamp 413 is likely to be attracted, it is possible to effectively cool the light source lamp 413.

The rotating plate 73 rotates by its own weight, opens and closes at least a part of the plurality of duct portions D1 to D3, and then switches the flow path of the cooling gas K. Therefore, for example, it is possible to circulate the cooling gases K1 to K3 to any one of the plurality of duct portions D1 to D3 according to the posture of the lighting device 31. In addition, since such a rotating plate 73 switches the flow path of the cooling gas K by its own weight, there is no need to provide a detection unit for detecting the installation posture of the lighting device 31 and a rotating unit such as a motor for rotating the rotating plate 73 according to a detected posture. Therefore, even if the lighting device 31 is in any posture, it is possible to always blow the cooling gases K1 to K3 to the position in which heat of the light source lamp 413 is likely to be attracted. Thus, it is possible to efficiently cool the light source lamp 413 with a simple configuration.

In addition, it is possible to reduce the light source device 41 by providing the diverging device 7 in the first lamp unit 4A and the second lamp unit 4B. Thus, it is possible to reduce the sizes of the lighting device 31 including the light source device 41 and the projector 1. In addition, since it is possible to reduce the size of the light source device 41 and to easily remove the first lamp unit 4A and the second lamp unit 4B from the projector 1, it is possible to easily perform replacement work of the light source device 41 and the like.

Here, as the installation posture of the projector, a portrait posture that is obtained by rotating the projector by 90° in a direction orthogonal to a rotating direction can be exemplified in addition to the normal posture, the upward posture, and the downward posture. Among them, if the projector 1 is installed in the portrait posture with respect to the normal posture, the upward posture, and the downward posture, it is not preferable that the inlets R1 to R3 to which the cooling gases K1 to K3 are guided are selected by the diverging device 7.

In contrast, in the embodiment, since the first lamp unit 4A and the second lamp unit 4B are configured to be replaced with respect to the projector 1 according to the installation posture of the projector 1, for example, instead of the diverging device 7 provided in each of the first lamp unit 4A and the second lamp unit 4B, the lighting device 31 in which the light source device 41 is mounted on the first lamp unit 4A and the second lamp unit 4B having the diverging device suitable for the portrait posture is separately prepared and can be mounted on the projector 1. Therefore, even if the projector 1 takes any one of the installation postures, it is possible to reliably cool the light source.

Variations of Embodiment

The invention is not limited to the embodiment described above and variations, improvements, and the like are included in the invention in a range that can achieve the object of the invention.

In the embodiment described above, the diverging device 7 is provided in each of the first lamp unit 4A and the second lamp unit 4B for each of the light source devices 41A to 41D. However, the invention is not limited to the embodiment. For example, one diverging device corresponding to the light source devices 41A and 41C may be provided in the first lamp unit 4A and one diverging device corresponding to the light source devices 41B and 41D may be provided in the second lamp unit 4B.

In the embodiment described above, the diverging device 7 changes the openings 83 to 85 mainly guiding the cooling gas K according to the posture of the lighting device 31. However, the invention is not limited to the embodiment. For example, the cooling gases K1 to K3 may be guided to predetermined openings 83 to 85 regardless of the posture of the lighting device 31 (projector 1).

In the embodiment described above, the diverging device 7 has the first to third duct portions D1 to D3 connected to each of the plurality of openings 83 to 85 and the rotating plate 73 as a shielding portion on the first to third inlets R1 to R3 side of the first to third duct portions D1 to D3. However, the invention is not limited to the embodiment. For example, as long as the inlets R1 to R3 can be shielded, a plate-like shielding member having a rotational shaft on one side may be provided instead of the rotating plate 73. In addition, the rotating plate 73 is rotated by its own weight, but is not limited to the embodiment. The inlets R1 to R3 may be shielded by providing a motor and the like, and controlling the motor by a control section (not illustrated) and the like.

In the embodiment described above, the first lamp unit 4A and the second lamp unit 4B are configured to be replaced according to the installation posture of the projector 1. However, the invention is not limited to the embodiment. For example, the first lamp unit 4A and the second lamp unit 4B may be configured to be fixed to the projector 1. Even with such a configuration, if the projector 1 is not used as the portrait posture, it is possible to reliably cool the light source lamp 413 even if the projector 1 is in one of postures of the normal posture, the upward posture, and the downward posture.

In the embodiment described above, the lighting device 31 in which the light source device 41 is mounted on the first lamp unit 4A and the second lamp unit 4B having the diverging device suitable for the portrait posture is separately prepared and can be mounted on the projector 1. However, the invention is not limited to the embodiment. For example, the first lamp unit 4A and the second lamp unit 4B are provided one by one and may be configured to be replaced with the diverging device suitable for the portrait posture during the portrait posture.

In the embodiment described above, the first lamp unit 4A and the second lamp unit 4B are disposed so as to pinch the optical path changing device 5. However, the invention is not limited to the embodiment. For example, the first and second lamp units 4A and 4B may be disposed side by side on one side of the optical path changing device 5 in the Z direction or may be disposed to be overlapped in the Y direction.

In the embodiment described above, the first lamp unit 4A and the second lamp unit 4B are provided. However, the invention is not limited to the embodiment. For example, one of the first lamp unit 4A and the second lamp unit 4B may be provided. Even in this case, since the diverging device 7 is provided in one of the first lamp unit 4A and the second lamp unit 4B, it is possible to reduce the sizes of the light source devices 41A to 41D.

In the embodiment described above, the transmission type liquid crystal panels 341 (341R, 341G, and 341B) are used as the light modulation device. However, the invention is not limited to the embodiment. For example, a reflection type liquid crystal panel may be used instead of the transmission type liquid crystal panel 341 (341R, 341G, and 341B). In this case, color separation and color synthesis may be executed by the color synthesizing device 344 without providing the color separation device 33.

In the embodiment described above, the projector 1 includes three liquid crystal panels 341 (341R, 341G, and 341B), but the invention is not limited to the embodiment. That is, the invention can be applied to a projector in which two or less or four or more liquid crystal panels are used.

In addition, a digital micromirror and the like may be used instead of the liquid crystal panel. In the embodiment described above, the light source lamp 413 of the light source devices 41A to 41D includes the light emitting tube 4131 and the reflector 4134. However, the invention is not limited to the embodiment. For example, a Light Emitting Diode (LED), a Laser Diode (LD), and the like may be provided.

In the embodiment described above, the projector 1 includes the light source devices 41A to 41D. However, the invention is not limited to the embodiment. For example, six or eight light source devices may be provided.

In the embodiment described above, the image forming apparatus 3 is configured to be a substantially U shape. However, the invention is not limited to the embodiment. For example, an image forming apparatus configured to be a substantially L shape may be employed.

What is claimed is:

1. A lighting device comprising:
a plurality of light source devices, each light source device including:
a light source; and
a storing body storing the light source, the storing body having a plurality of openings for introducing cooling gas; and
a holding member for holding the plurality of light source devices, the holding member including a diverging device for guiding the cooling gas to at least one opening among the plurality of openings, the diverging device including a rotating plate that rotates by its own weight around an axis parallel to a flow direction of the cooling gas.

2. The lighting device according to claim 1, wherein the diverging device is provided in each of the plurality of light source devices.

3. The lighting device according to claim 1, wherein the diverging device changes the opening mainly guiding the cooling gas according to a posture of the lighting device.

4. The lighting device according to claim 1, wherein the diverging device includes:
a plurality of duct portions connected to each of the plurality of openings; and
the rotating plate positioned on a side of the plurality of duct portions to which the cooling gas is introduced and provided for opening and closing at least a part of the plurality of duct portions.

5. A projector comprising:
the lighting device according to claim 1;
a light modulation device modulating light emitted from the lighting device;
a projection optical device projecting an image based on light modulated by the light modulation device; and
a cooling device supplying the cooling gas.

6. A projector comprising:
the lighting device according to claim 2;
a light modulation device modulating light emitted from the lighting device;
a projection optical device projecting an image based on light modulated by the light modulation device; and
a cooling device supplying the cooling gas.

7. A projector comprising:
the lighting device according to claim 3;
a light modulation device modulating light emitted from the lighting device;
a projection optical device projecting an image based on light modulated by the light modulation device; and
a cooling device supplying the cooling gas.

8. A projector comprising:
the lighting device according to claim 4;
a light modulation device modulating light emitted from the lighting device;
a projection optical device projecting an image based on light modulated by the light modulation device; and
a cooling device supplying the cooling gas.

9. The projector according to claim 5, wherein the holding member is configured to be replaced according to an installation posture of the projector.

10. The projector according to claim 5, wherein the diverging device is configured to be replaced according to an installation posture of the projector.

* * * * *